(12) United States Patent
Trevino Rojas

(10) Patent No.: US 12,456,126 B2
(45) Date of Patent: Oct. 28, 2025

(54) SYSTEMS AND PROCESSES THAT AUGMENT TRANSPARENCY OF TRANSACTION DATA

(71) Applicant: Paybook, Inc., W Lake Hills, TX (US)

(72) Inventor: Gerardo Trevino Rojas, W Lake Hills, TX (US)

(73) Assignee: Paybook, Inc., W Lake Hills, TX (US)

( * ) Notice: Subject to any disclaimer, the term of this patent is extended or adjusted under 35 U.S.C. 154(b) by 138 days.

(21) Appl. No.: 17/635,341

(22) PCT Filed: Aug. 13, 2020

(86) PCT No.: PCT/US2020/046215
§ 371 (c)(1),
(2) Date: Feb. 14, 2022

(87) PCT Pub. No.: WO2021/030609
PCT Pub. Date: Feb. 18, 2021

(65) Prior Publication Data
US 2022/0277321 A1 Sep. 1, 2022

Related U.S. Application Data

(60) Provisional application No. 62/886,808, filed on Aug. 14, 2019.

(51) Int. Cl.
*G06Q 30/0201* (2023.01)
*G06Q 20/38* (2012.01)
*G06Q 50/00* (2024.01)

(52) U.S. Cl.
CPC ..... *G06Q 30/0201* (2013.01); *G06Q 20/3827* (2013.01); *G06Q 50/01* (2013.01)

(58) Field of Classification Search
CPC ........... G06Q 30/0201; G06Q 20/3827; G06Q 50/01; G06Q 40/02; G06Q 20/384
See application file for complete search history.

(56) References Cited

U.S. PATENT DOCUMENTS 10,120,734 B1 * 11/2018 Doraiswamy ........... G06F 21/44
10,325,259 B1 * 6/2019 Shahidzadeh .......... G06Q 20/40
(Continued)

FOREIGN PATENT DOCUMENTS

WO WO-2010003137 A1 * 1/2010 ............. G06Q 40/00
WO WO-2014164382 A1 * 10/2014 ............. G06Q 30/06
(Continued)

OTHER PUBLICATIONS

Best, Ellen, et al. Risk and Rewards of Financial Disclosure on Twitter. The CPA Journal, Jun. 2019. Last accessed on Nov. 17, 2023 via https://www.cpajournal.com/2019/06/26/risks-and-rewards-of-financial-disclosure-on-twitter/. (Year: 2019).*
(Continued)

*Primary Examiner* — Thomas Yih Ho
(74) *Attorney, Agent, or Firm* — Lee & Hayes, P.C.

(57) ABSTRACT

Techniques for augmenting transparency of published transaction data are described. The techniques can include one or more of associating a financial account with an account of a user at a transaction management platform, receiving transaction data from the financial account, categorizing the transaction data, publishing the transaction data, assigning permission levels to user for different levels of access to the amount and granularity of published transaction data, storing an immutable record of transaction data from which changes to the transaction data can be determined, and enabling crowd intelligence about the entity, account, or transactions by recording interaction of users of the published transaction data.

20 Claims, 15 Drawing Sheets

(56) References Cited

U.S. PATENT DOCUMENTS

| | | | | |
|---|---|---|---|---|
| 2002/0042764 | A1* | 4/2002 | Gardner | G06Q 40/03 705/35 |
| 2011/0246378 | A1* | 10/2011 | Prussack | G06Q 50/184 705/347 |
| 2013/0018957 | A1* | 1/2013 | Parnaby | G06Q 30/0203 709/204 |
| 2013/0318592 | A1* | 11/2013 | Grier, Sr. | G06Q 40/02 726/9 |
| 2013/0346320 | A1* | 12/2013 | Jin | G06Q 20/10 705/76 |
| 2015/0213472 | A1* | 7/2015 | Raikula | G06Q 30/0215 705/14.17 |
| 2016/0027124 | A1* | 1/2016 | Rojas | G06Q 40/02 705/30 |
| 2016/0350748 | A1* | 12/2016 | Pruthi | H04L 63/061 |
| 2017/0070500 | A1* | 3/2017 | Hockey | H04L 9/3213 |
| 2017/0140473 | A1 | 5/2017 | Liberman et al. | |
| 2017/0161844 | A1 | 6/2017 | Rojas | |
| 2019/0095992 | A1 | 3/2019 | Soh | |
| 2019/0236594 | A1* | 8/2019 | Ehrlich-Quinn | G06Q 20/401 |
| 2021/0027302 | A1* | 1/2021 | Resheff | G06N 5/01 |

FOREIGN PATENT DOCUMENTS

| | | | | |
|---|---|---|---|---|
| WO | WO-2016088087 A1 | * | 6/2016 | |
| WO | WO-2018152377 A1 | * | 8/2018 | G06Q 30/06 |

OTHER PUBLICATIONS

Acker, Amelia, and Dhiraj Murthy. "Venmo: Understanding mobile payments as social media." Proceedings of the 9th international conference on social media and society. 2018. (Year: 2018).*

Caraway, Monica, Daniel A. Epstein, and Sean A. Munson. "Friends don't need receipts: The curious case of social awareness streams in the mobile payment app Venmo." Proceedings of the ACM on Human-Computer Interaction 1.CSCW (2017): 1-17. (Year: 2017).*

Marinelli, Igor Vinicius Alvarenga. "Blockchain technology applications for financial transparency in non profit organizations." (2019). (Year: 2019).*

The International Preliminary Report on Patentability for PCT Application No. PCT/US20/46215, mailed Feb. 24, 2022.

The PCT Search Report and Written Opinion mailed on Nov. 10, 2020 for PCT Application No. PCT/US20/46215, 13 pages.

Office Action for Mexican Application No. MX/a/2022/001945, Dated Apr. 29, 2025, 13 pages.

* cited by examiner

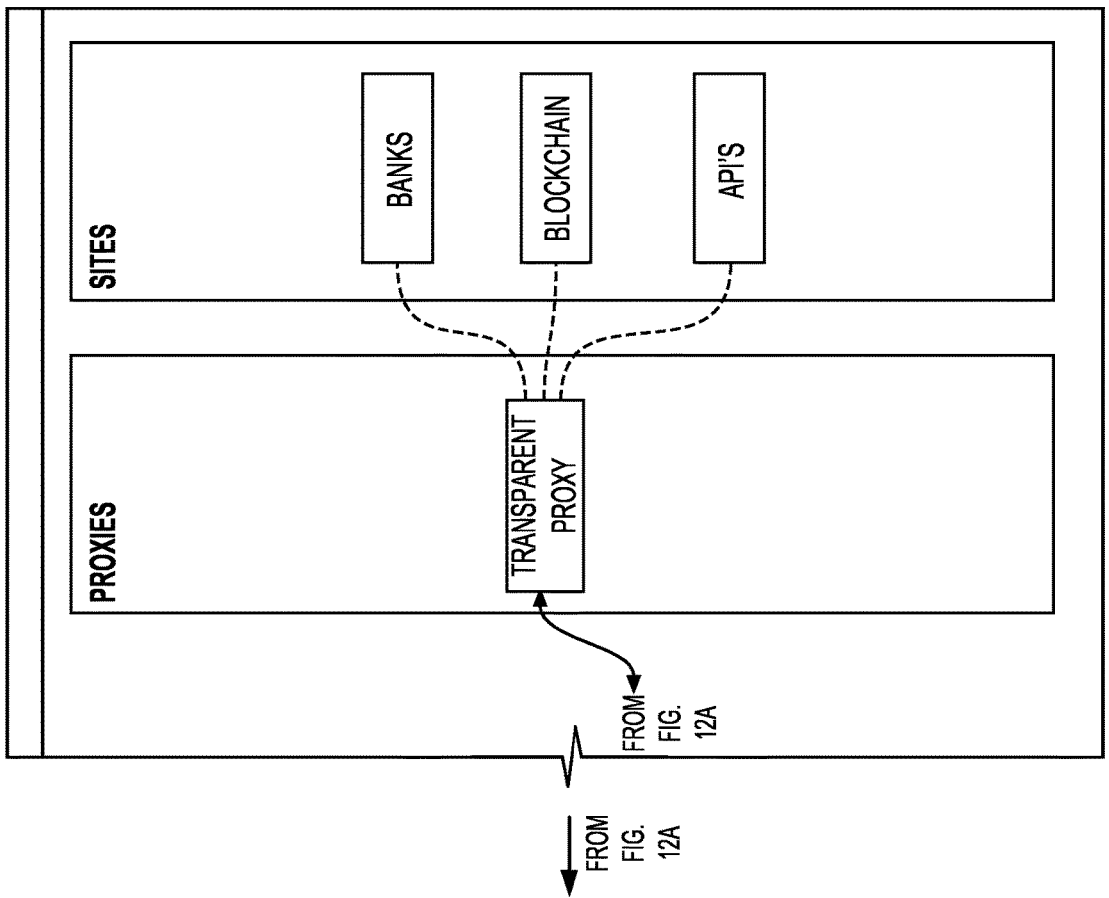

SYSTEMS AND PROCESSES THAT AUGMENT TRANSPARENCY OF TRANSACTION DATA

RELATED APPLICATIONS

This application claims priority to PCT Application No. PCT/US20/46215, filed Aug. 13, 2020, which claims priority to U.S. Provisional Patent Application No. 62/886,808, filed Aug. 14, 2019, which are incorporated herein.

BACKGROUND

Conventionally, financial transaction data has been published online at a single level of access and granularity. For example, a nonprofit organization may choose to list its financial transactions on its website, and different types of stakeholders all see the same data when they visit the site. Customizing the transaction data according to the audience has traditional required time and expense that the nonprofit organization may not have.

Additionally, conventionally, viewers of published transaction information are unable to determine if the transaction data has been altered or deleted, whether accidentally or fraudulently. Publishing transaction information is of little value without an accompanying reassurance of its integrity. Additionally, conventionally, there has not been a financial social platform that allows online collaboration regarding published financial data.

Moreover, traditionally, donors to charities, political campaigns, disaster relief efforts, and the like have had to await quarterly or annual reports to see how their donations are being spent, if that information is made available at all.

There is a need for techniques for publishing transaction data in real time or near-real time together with an indication of whether transaction data for individual transactions has been altered.

There is a further need for techniques for publishing transaction data in a manner that the access to granularity of the transaction data can be automatically customized at levels that are based at least in part on characteristics of the individual who seeks to access the transaction data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. The figures can represent simplified illustrations of examples described herein.

FIGS. 12A and 12B illustrate a flow diagram illustrating an example process for incoming data flow associated with a synchronizing service ("syncing service").

DETAILED DESCRIPTION

Figure 1:
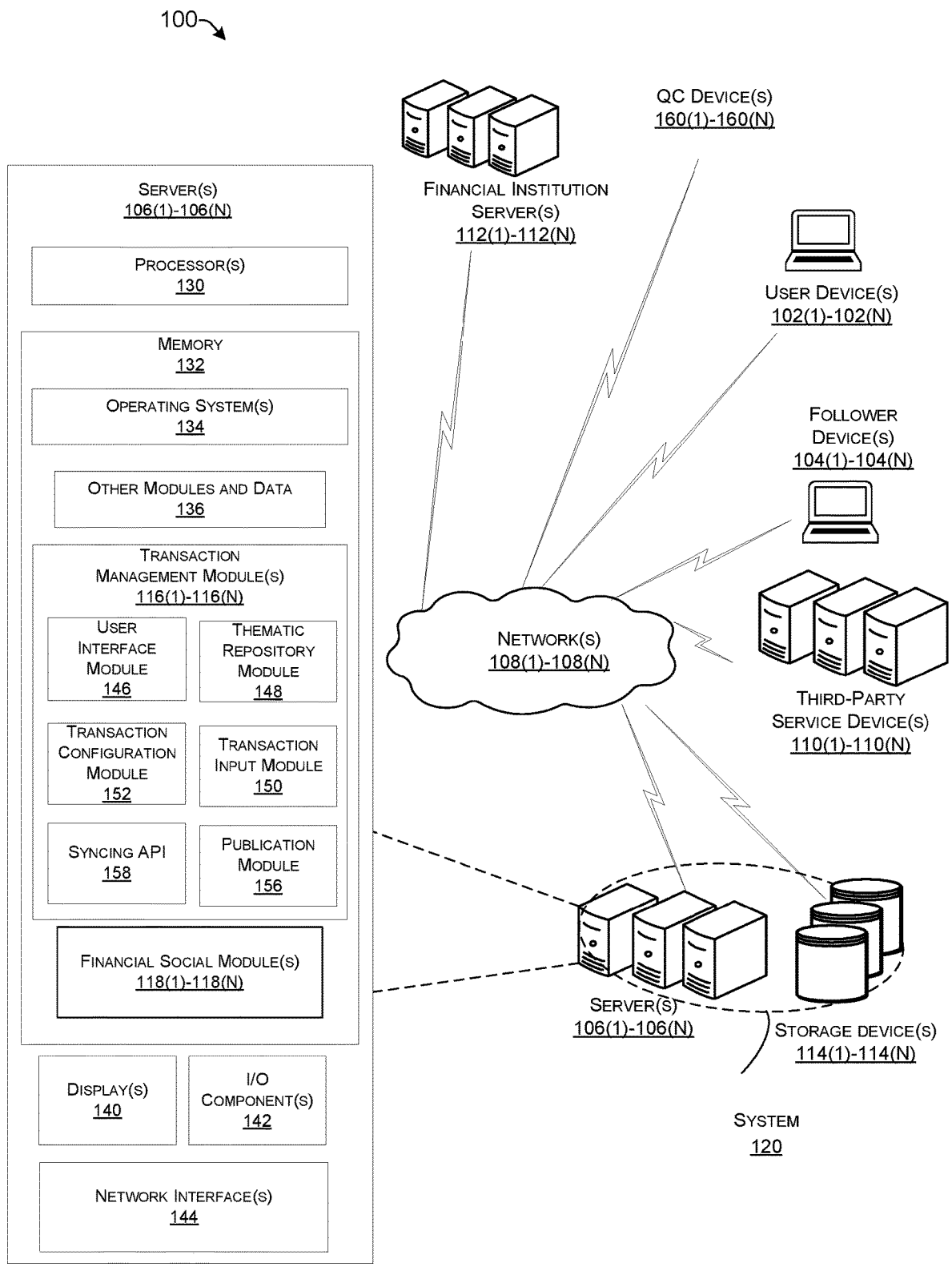
FIG. 1 illustrates an example operating environment 100 in which techniques described herein may be implemented, as described herein.

The present disclosure is generally directed to a system and a method that facilitate and augment transaction data transparency. In examples, the system includes one or more server devices and one or more storage device. The server device(s) can be configured to include one or more transaction management module(s) and one or more financial social module(s) that enable a transaction management platform and a financial social network.

The techniques described herein are directed actions including publishing an entity's transaction data directly from a financial institution, selecting one or more audiences for published transaction data, monitoring transaction data for changes, alerting an entity's followers and/or stakeholders to changes to transaction data, certifying the integrity of the transaction data, providing escalating permissions and escalating levels of data amount and granularity to which viewers are entitled, classifying transaction data into multiple category hierarchies, and/or adding metadata to raw financial transaction data. As used herein, "augmented transparency" and variations thereof can include one or more of the aforementioned actions.

As used herein, "follower" can include a person or organization that has access to published transaction data of an account that additionally or alternatively be notified of new, deleted, or changed published transaction data.

As used herein, "financial transaction data" and "transaction data" are used interchangeably and can include one or more data items related to identifying or otherwise describing transaction-related information. In examples, descriptions of purchased items and the amount paid for the items can be considered transaction data. Other possible parameters that can be considered transaction data with respect to a transaction include, but are not limited to: name of payee, vendor, or business from which items were purchased; location of transaction (including geocoding information); date of purchase; time of purchase; method of payment; and details regarding the method of payment such as debit or credit card used, financial account associated with card, name of the financial institution, account type, and account number; or any combination thereof.

As used herein, a "financial institution" can include a central bank, a retail bank, a commercial bank, an internet bank, a credit union, a savings and loans association, an investment bank, an investment company, a brokerage firm, an insurance company, a mortgage company, a tax authority (e.g., Tax Administration Service of Mexico (Servicio de Administración Tributaria or SAT), Administración Federal de Ingresos Públicos of Argentina (AFIP), etc.)), a digital currency exchange, a cryptocurrency exchange, a digital currency provider, blockchain, a utility, or other service provider.

As used herein, a "financial account" can include a cash account, a bank account (e.g., a checking account, a savings account, etc.), an investment account, or any combination thereof. As used herein, "bank account" can include any type of account at a financial institution or brokerage house worldwide. A cash account can include a "safe," "cookie jar," "wallet," or any other repository where cash or cash equivalents or cryptocurrencies are stored.

As used herein, Paybook™ is an example of a "transaction management platform." Transaction management platforms generally allow for management of finances, for example, by linking to financial accounts of the user to access information about transactions. In examples, transaction management platforms can provide real time or near-real time transaction information. The Paybook™ transaction management platform has additional features beyond conventional transaction management platforms, including enabling use of thematic repositories to organize transactions by theme as described at least in part in U.S. Pat. No. 10,121,208 and allowed U.S. patent application Ser. No. 15/433,966 (U.S. Patent Pub. No. 2017-0161844), each of which are incorporated herein by reference. Examples of conventional transaction management platforms include Venmo™, Mint™, QuickBooks™, and Quicken™. Additionally, Paybook has publishing and sharing capabilities not known from conventional transaction management platforms. For example, Glass™ is a financial social network associated with Paybook™, which allows publication of financial transaction data and enables others to access and interact with the data.

Example systems described herein can include one or more processors, memory, and one or more transaction management modules and one or more financial social modules. The transaction management module(s) can be maintained in the memory and executed on the one or more processors to configure the system to perform acts. The acts can include one or more of linking a user account at the transaction management platform to an entity's financial account at a financial institution, receiving raw transaction data from a financial institution, publishing transaction data, and/or publishing additional information about transaction data. The transaction management module(s) enable the transaction management platform.

Based at least in part on the transaction data associated with the transaction, the transaction management module(s) can determine that the transaction is associated with at least one thematic repository of a plurality of thematic repositories. An individual thematic repository of the plurality of thematic repositories can, for example, be configured to aggregate information from a plurality of financial transactions that are individually determined to be associated with a theme of the individual thematic repository. A user can create a thematic repository to manage transactions from one or more financial accounts that have one or more attributes under a common theme as defined by the user. In response to a request related to the transaction, at least an indication that the transaction is associated with the at least one thematic repository of the plurality of thematic repositories can be provided.

Additionally or alternatively, based on the transaction data, the transaction management module(s) can determine that a transaction can be categorized in one or more types of categories.

An entity with which a financial account is associated can include one or more of an individual, a business, a nonprofit organization, a political campaign, a government entity, etc. As used herein, an "entity" includes a person or organization with whom a financial account is associated, and to which financial transactions of the financial account are ultimately attributed. As used herein, a "user" includes a person who holds an account with the transaction management platform and who may have access to, or other permissions for, one or more of financial accounts of an entity.

Additionally or alternatively, the system can make raw transaction data actionable at different levels by different circles of stakeholders of an entity by associating the transaction data with information that defines the granularity and amount of transaction data that each circle of stakeholders is entitled to view.

In examples, the system can automate collection of transaction data and thereby decreases manual efforts required to disseminate transaction data.

Moreover, techniques described herein can provide entities a means of demonstrating their financial integrity by laying open their transactions, thereby differentiating themselves in the marketplace. Conversely, techniques described herein can hinder financial malfeasance by allowing others to review transaction data and by providing indications of any changes to the transaction data.

Via augmented transparency as provided by techniques described herein, transaction data can be laid open for the public to view and use in a way that ensures no manipulation of the raw transaction data by the public (or that ensures that manipulation is trackable and detectable). This creates increased trust in how entities are spending funds (e.g., the way donations are being handled, the way a nonprofit is allocating funds, etc.). In an example, the entity is a nonprofit organization that collects, manages, and disperses donations. In the example, the nonprofit organization would like to publish financial transaction data to enhance trust with stakeholders and the public and provide reassurance that the transaction data has not been altered. Techniques described herein enable this type of publication.

The techniques described herein enable transactions to be viewed by stakeholders in real time.

Additionally, techniques described herein increase the utility of transaction data to consumers of the transaction data by provision of categorizations and summaries of the transaction data.

Moreover, the techniques described herein enable publication of transaction data on a financial social network (which can be part of, or separate from, the transaction management platform) that provides for social collaboration regarding financial transactions and enables crowd intelligence. The crowd intelligence can be both deeper and broader than an auditor or financial controller can achieve and can identify transactions that may need closer scrutiny by the entity.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes, or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

Throughout this disclosure, reference is made to presenting a UI. It should be noted that in some examples, an application or module can generate instructions for presenting a UI and can execute such instructions for presenting the UI. Alternatively, in some examples, a first application or module can generate the instructions and send the instructions to a second application or module. In such examples, the second application or module can execute the received instructions for presenting the UI. In some examples, the first application or module and the second application or module can be executing on same computing devices or different computing devices.

Example Operating Environment

FIG. 1 illustrates an example operating environment 100 in which techniques described herein may be implemented, as described herein. The operating environment 100 may include one or more user device(s) 102(1)-102(N) and one or more follower device(s) 104(1)-104(N). The one or more user device(s) 102(1)-102(N) and the one or more follower device(s) 104(1)-104(N) may be coupled to one or more server device(s) 106(1)-106(N) (also referred to herein a "server(s)"), across one or more network(s) 108(1)-108(N). In examples, the operating environment 100 may include one or more third-party service device(s) 110(1)-110(N) (also referred to herein as "third-party device(s)") and one or more financial institution server(s) 112(1)-112(N). The operating environment 100 may also include one or more storage device(s) 114(1)-114(N). System 120 includes server(s) 106 (1)-106(N) and storage device(s) 114(1)-114(N).

For simplicity of reference, components throughout this disclosure may be referred to in the singular form and in connection with a single generalized reference numeral. For example, the one or more user device(s) 102(1)-102(N) (i.e., the plural form) may be referred to as a user device 102 (i.e., the singular form). Nonetheless, it should be understood that use of the singular form may include the plural form in certain implementations.

One or more of the user device 102, the follower device 104, or the server 106 can include any type of computing device that is generally configured to perform an operation. For example, one or more of the user device 102, the follower device 104, or the server 106 can be implemented as a laptop computer, a desktop computer, a server, a smart phone, an electronic reader device, a mobile handset, a personal digital assistant (PDA), a portable navigation device, a portable gaming device, a tablet computer, a watch, a portable media player, a television, a set-top box, a computer system in a car, an appliance, a camera, a robot, a hologram system, a home-based computer system (e.g., intercom system, home media system, etc.), a projector, an automated teller machine (ATM), a pair of glasses with computing capabilities, and so on.

In certain implementations, a user can use the user device 102 to perform acts including, but not limited to, managing, sharing, and/or publishing transaction activity. User device 102 is discussed further below, at least in relation to FIG. 2. In certain implementations, a follower can use the follower device 104 to perform acts including, but not limited to, reviewing, viewing, reacting to, sharing, following, or otherwise consuming published data. Follower device 104 is discussed further below, at least in relation to FIG. 3.

The operating environment 100 includes system 120. System 120 includes server(s) 106(1)-106(N) and storage device(s) 114(1)-114(N).

The storage device 114 can store, for example, transaction data. The user device 102, the follower device 104, the server 106, or any combination thereof, can be coupled to the storage device 114 across the network 108. Additionally, or alternatively, the storage device 114 can reside locally with respect to the user device 102, the server 106, or both. In certain implementations, the storage device 114 can include one or a combination of computer readable media. Computer readable media includes computer storage media and computer-readable signals.

Computer storage media includes volatile and non-volatile, removable and non-removable media implemented in any method or technology for storage of information, such as computer readable instructions, data structures, program modules, or other data. Computer storage media includes, but is not limited to, solid-state memory, phase change memory (PRAM), static random-access memory (SRAM), dynamic random-access memory (DRAM), other types of random access memory (RAM), read-only memory (ROM), electrically erasable programmable read-only memory (EE- PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In addition, in some examples the computer readable media can be associated with transitory computer-readable signals (in compressed or uncompressed form). Examples of computer-readable signals, whether modulated using a carrier or not, include, but are not limited to, signals that a computer system hosting or running a computer program can be configured to access, including signals downloaded through the internet or other networks.

FIG. 1 includes a block diagram of select components of one or more example server device(s) 106(1)-106(N). The server 106 can include one or more processors 130, memory 132, one or more operating systems 134, one or more transaction management module(s) 116, one or more financial social module(s) 118, other modules and data 136, one or more displays 140, one or more input/output (I/O) components 142, one or more network interfaces 144, or any combination thereof.

A processor 130 can itself include one or more processors or processing cores. For example, the one or more processors 130 can be implemented as one or more microprocessors, microcomputers, microcontrollers, digital signal processors, central processing units, state machines, logic circuitries, and/or any devices that manipulate signals based on operational instructions. In some examples, the one or more processors 130 can be one or more hardware processors and/or logic circuits of any suitable type specifically programmed or configured to execute the algorithms and processes described herein. The one or more processors 130 can be configured to fetch and execute computer-readable processor-executable instructions stored in memory 132.

Depending on the configuration of server 106, memory 132 can be an example of computer storage media and can include volatile and nonvolatile memory and/or removable and non-removable media implemented in any type of technology for storage of information such as computer-readable processor-executable instructions, data structures, program modules or other data as discussed above. For example, memory 132 can include, but is not limited to, RAM, ROM, EEPROM, flash memory, solid-state storage, magnetic disk storage, optical storage, and/or other computer-readable media technology. Further, in some examples, server 106 can access external storage, such as RAID storage systems, storage arrays, network attached storage, storage area networks, cloud storage, or any other medium that can be used to store information and that can be accessed by the one or more processors directly or through another computing device or network. Accordingly, server 106 can include computer storage media able to store instructions, modules, or components that can be executed by the one or more processors 130. Further, when mentioned, non-transitory computer-readable media and computer storage media exclude media such as energy, carrier signals, electromagnetic waves, and signals per se.

In addition, computer readable media including memory 132 can be associated with transitory computer-readable signals (in compressed or uncompressed form). Examples of computer-readable signals, whether modulated using a carrier or not, include, but are not limited to, signals that a computer system hosting or running a computer program can be configured to access, including signals downloaded through the internet or other networks.

Memory 132 can be used to store and maintain any number of functional components that are executable by the one or more processors 130. In some implementations, these functional components include instructions or programs that are executable by the one or more processors and that, when executed, implement operational logic for performing the actions and services attributed above to server 106.

The term "module" is intended to represent example divisions of the software for purposes of discussion and is not intended to represent any type of requirement or required method, manner or necessary organization. Accordingly, while various "modules" are discussed, their functionality, similar functionality, or both, could be arranged differently (e.g., combined into a fewer number of modules, broken into a larger number of modules, etc.). The modules can include computer instructions/code that can be stored in the memory 132 and can be executable by the one or more processors 130.

Furthermore, memory 132 can include one or more additional functional components, such as operating system 134 for controlling and managing various functions of server 106 and for enabling basic user interactions. In addition, memory 132 can store data, data structures and the like, that are used by the functional components.

Depending on the type of server 106, memory 132 can also optionally include other functional components and data, such as other modules and data 136, which can include one or more of programs, drivers, etc., and the data used or generated by the functional components. Further, server 106 can include many other logical, programmatic, and physical components, of which those described are merely examples that are related to the discussion herein.

The server 106 be configured with, or otherwise include, one or more transaction management module(s) 116(1)-116(N) and one or more financial social modules 118(1)-118(N). In examples, the transaction management module 116 and the financial social module 118 provide the functionality for carrying out the techniques described in this disclosure.

The transaction management module(s) 116 can include one or more of a user interface module 146, a thematic repository module 148, a transaction input module 150, a transaction configuration module 152, a synchronizing application programming interface ("syncing API") 158, a publication module 156, or any combination thereof.

For purposes of clarity of this disclosure, the transaction management module 116 can be composed of executable computer code that can be executed by one or more processors 130 to allow a user of the user device 102 to perform actions described herein.

User interface module 146 can be maintained in memory 132 and executed on the processor(s) 130 to perform acts. The acts can include one or more of receiving a user's request related to an account with the transaction management platform and, in response to receiving the request, causing to be presented an aggregation of information from a plurality of transactions that are determined to be associated with the account. Additionally or alternatively, the acts can include generating a user interface that allows a user to perform actions including one or more of view, sort, filter, or any combination thereof, at least a portion of the aggregation of information at varying levels of granularity. Additionally or alternatively, the acts can include linking a financial account to the user's account with the transaction management platform. Additionally or alternatively, user interface module 146 can cause a user interface to be provided to a follower. Additionally or alternatively, user interface module 146 can cause a user interface to be provided to a user to prompt entry of user credentials for, for example, a transaction management platform account and/or a financial account. In examples, the user interface module 146 can provide a user interface that can be used as a vehicle for operating the functionality provided by transaction management module(s) 116, including one or more of allowing a user to input data, receive data, view data, configure data, share data, publish data, or any combination thereof.

In certain instances, user interface module 146 can be configured to provide a user interface corresponding to a particular server 106, user device 102, or third party service device 110, being used. For example, information can be presented to the user or follower in a different manner when presented on a mobile phone than when presented on a personal computer.

In some examples, the user interface can be provided to a user or follower via a web browser (e.g., software as a service (SaaS)), via a downloadable client application, or both.

User interface module 146 can be configured to provide a summary view related to features provided by the transaction management module(s) 116 or financial social module(s) 118.

The thematic repository module 148 can designate at least a portion of transaction data associated with a transaction to a first repository. The transaction management module(s) 116 can determine, based on the transaction data, that the transaction is associated with a first theme and a second theme. The first repository can be configured to provide an aggregation of information associated with a plurality of financial transactions that are individually determined to be associated with the first theme. The thematic repository module 148 can designate at least a portion of the transaction data associated with the transaction to a second repository. The second repository can be configured to provide an aggregation of information associated with a plurality of financial transactions that are individually determined to be associated with the second theme.

The transaction input module 150 can be configured to enable receipt of transaction data. A user can be enabled to input information for setting up various accounts, thematic repositories, connections/collaborators, and the like, in order to more efficiently track, manage, or publish financial transactions. The transaction input module 150 can be configured to enable creation of various financial accounts with the transaction management platform to allow the tracking of financial transaction information. The transaction input module 150 can also be configured to allow a user to input information about one or more entities for which the user would like to manage transaction activity using the transaction management platform (e.g., via the transaction management module(s) 116). For example, the user may be allowed to input data regarding employees that might collaborate with the user regarding certain transaction activity using the transaction management platform.

The transaction input module 150 can also be configured to enable input of transaction data. The transaction input module 150 can cause received transaction data to be stored (e.g., in the storage device 114 or in the memory 132).

Upon receiving transaction data, the transaction input module 150 can provide the transaction data to the user via a user interface.

The transaction configuration module 152 can provide for the configuring of transaction data. For example, the transaction configuration module 152 can receive a request from a user to configure transaction data. The request can include providing any suitable indication that the user wants to configure transaction data, such as, for example, selecting a menu item designated for initiating the configuration of transaction data. In some instances, however, the transaction configuration module 152 can proactively present a user with the option to configure transaction data, or can configure transaction data according to default parameters without user request.

The transaction configuration module 152 can provide, via the user interface, a vehicle for configuring the transaction data (e.g., editing text or graphics presented to the user). Further, the user and/or follower can configure transaction data by selecting menu items via a user interface or in any manner suitable for transmitting configuration instructions to the transaction configuration module 152. When the user device 102 or follower device 104 provide a touch screen or similar technology, transaction data can be configured using touch screen gestures to indicate how the user wants to configure the transaction data. Configuring transaction data should not alter the underlying raw transaction data; if, in configuring transaction data, the raw transaction data is altered, the change will be recorded and/or flagged as described herein.

In examples, configuring the transaction data includes adding annotations, categorizations, and/or electronic documents that are determined to be associated with transaction data.

In examples, the configuration of transaction data can generate configuration data, and the transaction configuration module 152 can associate the generated configuration data with the transaction data. The transaction configuration module 152 can cause the transaction data and/or the associated configuration data to be stored (e.g., in the storage device 114 or in the memory 132).

The syncing API 158 can be included in the transaction management module 116 and/or associated with the transaction management module 116. The syncing API 158 can receive and transmit data between the transaction management module 116 and the financial institution server 112, and between the transaction management module 116 and the third-party service device 110. The syncing API can be configured to implement rules and/or instructions to perform actions including one or more of linking financial accounts to the transaction management module 116, retrieving transaction data, updating transaction data, or normalizing transaction data.

The publication module 156 can share a selected account, profile, thematic repository, or individual transaction(s) between a user and a follower and/or between followers. The publication module 156 can also publish the selected account, profile, thematic repository, or individual transaction(s) to a public forum and/or to a financial social network. The publication module 156 can publish the selected account, profile, thematic repository, or individual transaction(s) to a forum within or outside of the transaction management platform.

The financial social module 118 can be composed of executable computer code that can be executed by one or more processors 130. The financial social module 118 can enable a user to interact regarding transaction activity in a social forum. For example, the financial social module 118 can provide for the integration of one or more financial social networks with the transaction management platform. A financial social network can be provided by the financial social module 118 such that a user of the transaction management platform can interact with other users of the transaction management platform. Further, external social networks can be integrated within the transaction management platform via third-party applications, thereby allowing a user of the transaction management platform to engage with users of the external social networks.

The financial social module 118 can receive, from a user device 102, a selection of at least one follower with which to share a selected account, profile, thematic repository, or individual transaction(s). The financial social module 118 can set a sharing permission policy. In some instances, the user can select the parameters for the sharing permission policy. In other instances, a default or a system-defined sharing permission policy can be set. The sharing permission policy can define the proposed sharing relationship between a user and one or more followers, and/or between one or more followers. That is, the sharing permission policy can define rules with respect to what can and what cannot be shared between the user and the one or more followers or between the followers.

The financial social module 118 can determine whether a follower has an account with the transaction management platform. Based on determining that the follower has a transaction management account, the financial social module 118 can notify the follower of a proposed sharing relationship. The financial social module 118 can also determine whether the follower accepts the proposed sharing relationship. If the follower accepts the proposed sharing relationship, then the financial social module 118 can send a notification to the user device 102 that the follower accepted the sharing relationship.

If it is determined that the follower does not have an account with the transaction management platform, the financial social module 118 can send an invitation to the follower to create a transaction management account. The financial social module 118 can do so automatically, or at the request of the user. The financial social module 118 can determine whether the follower creates a transaction management account.

In at least one example, server 106 can include one or more displays 140. Depending on the type of computing device(s) used as server 106, display 140 can employ any suitable display technology. For example, display 140 can be a liquid crystal display, a plasma display, a cathode ray tube (CRT) monitor, a light emitting diode display, an OLED (organic light-emitting diode) display, an electronic paper display, or any other suitable type of display able to present digital content thereon. In some examples, display 140 can have a touch sensor associated with display 140 to provide a touchscreen display configured to receive touch inputs for enabling interaction with a graphic interface presented on display 140. Accordingly, implementations herein are not limited to any particular display technology. Alternatively, in some examples, server 106 may not include display 140, and information can be presented by other means, such as aurally.

I/O component 142 can be configured to allow a user to interface with the server 106 via one or more I/O devices. The I/O component 142 can provide an interface devices including one or more of a display 140, speakers (not shown), a microphone (not shown), a keyboard (not shown), a mouse (not shown), a camera (not shown), an optical reader (not shown), a touchpad (not shown), a haptic output device (not shown), or any combination thereof.

Network interface(s) 144 can include one or more interfaces and hardware components for enabling communication with various other devices, such as over network(s) or directly. For example, network interface(s) 144 can enable communication through one or more networks, which can include, but are not limited to any type of network known in the art such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof, etc. A network can include both wired and/or wireless communication technologies, including Bluetooth®, BLE, Wi-Fi and cellular communication technologies, as well as wired or fiber optic technologies, etc. Components used for such communications can depend at least in part upon the type of network, the environment selected, or both.

Server 106 can additionally include other devices including a GPS device (not shown) that is able to indicate location information. Further, server 106 can include one or more sensors (not shown), such as an accelerometer, gyroscope, compass, proximity sensor, camera, microphone, and/or a switch, as discussed above. Additionally, server 106 can include various other components that are not shown, examples of which include removable storage, a power source, such as a battery and power control unit, a printer, and so forth.

In examples, at least one of the user device 102 or the server 106 can access transaction data from one or more financial institution server(s) 112(1)-112(N). Financial institution server(s) 112 can include servers associated with one or more of banks, brokerage companies, credit card companies, financing companies, and the like. The user device 102, the server 106, or both, can provide transaction data received from the financial institution server(s) 112 such that a user can manage transactions corresponding to the transaction data received from the financial institution server 112. The financial institution server(s) 112 can include various components similar to those of the user device 102, the follower device 104 the server 106, or any combination thereof. Thus, it should be understood that any disclosure provided herein with respect to the user device 102, the server 106, or both, can also apply to financial institution server(s) 112.

In some examples, the operating environment 100 can include third party service device(s) 110(1)-110(N). Third party service device 110 operates intermediately between server 106 and financial institution server 112 in requesting and receiving transaction data from a financial institution. Third party service device 110 can include a third-party API.

In some implementations, the operating environment 100 can include one or more quality control (QC) devices 160(1)-160(N). The user device 102, the server 106, or both, can be coupled to the QC device 160 across the network 108. Additionally or alternatively, the QC device 160 can reside locally with respect to the user device 102, the server 106, or both. The QC device 160 can be configured to verify the accuracy and proper format of transaction data received from any of the financial institution server(s) 112, the user device 102, or the server 106 in response to receipt of the transaction data and/or as a result of input by a user, or to perform other quality control measures regarding such transaction data. In some examples, the QC device 160 can include or access one or more databases storing templates or other data for verifying the proper format of different types of transaction data. For example, the format of transaction data received from the user device 102, the server 106, or both, can be compared with information stored in the one or more databases. In some examples, the QC device 160 is capable of accessing templates, format data, or both, from financial institution server(s) 112.

The QC device 160 can perform quality control measures automatically. Additionally or alternatively, at least some of the quality control measures performed by the QC device 160 may not be automatic (i.e., operator involvement may be required). The QC device 160 can include various components similar to those of the user device 102, the server 106, or both. Thus, it should be understood that any disclosure provided herein with respect to the user device 102, the server 106, or both, can also apply to the QC device 160.

Those of ordinary skill in the art will appreciate that the hardware components and various functional modules depicted in FIG. 1 and elsewhere can vary. The illustrative components are not intended to be exhaustive, but rather are representative to highlight components that are utilized to implement the subject matter disclosed in the present application. For example, other devices/components can be used in addition to or in place of the hardware depicted. In addition, the various components illustrated in storage and memory can be alternatively located in any storage or memory across the network 108. The depicted example is not meant to imply architectural or other limitations with respect to the subject matter of this disclosure.

Example User Device(s)

Figure 2:
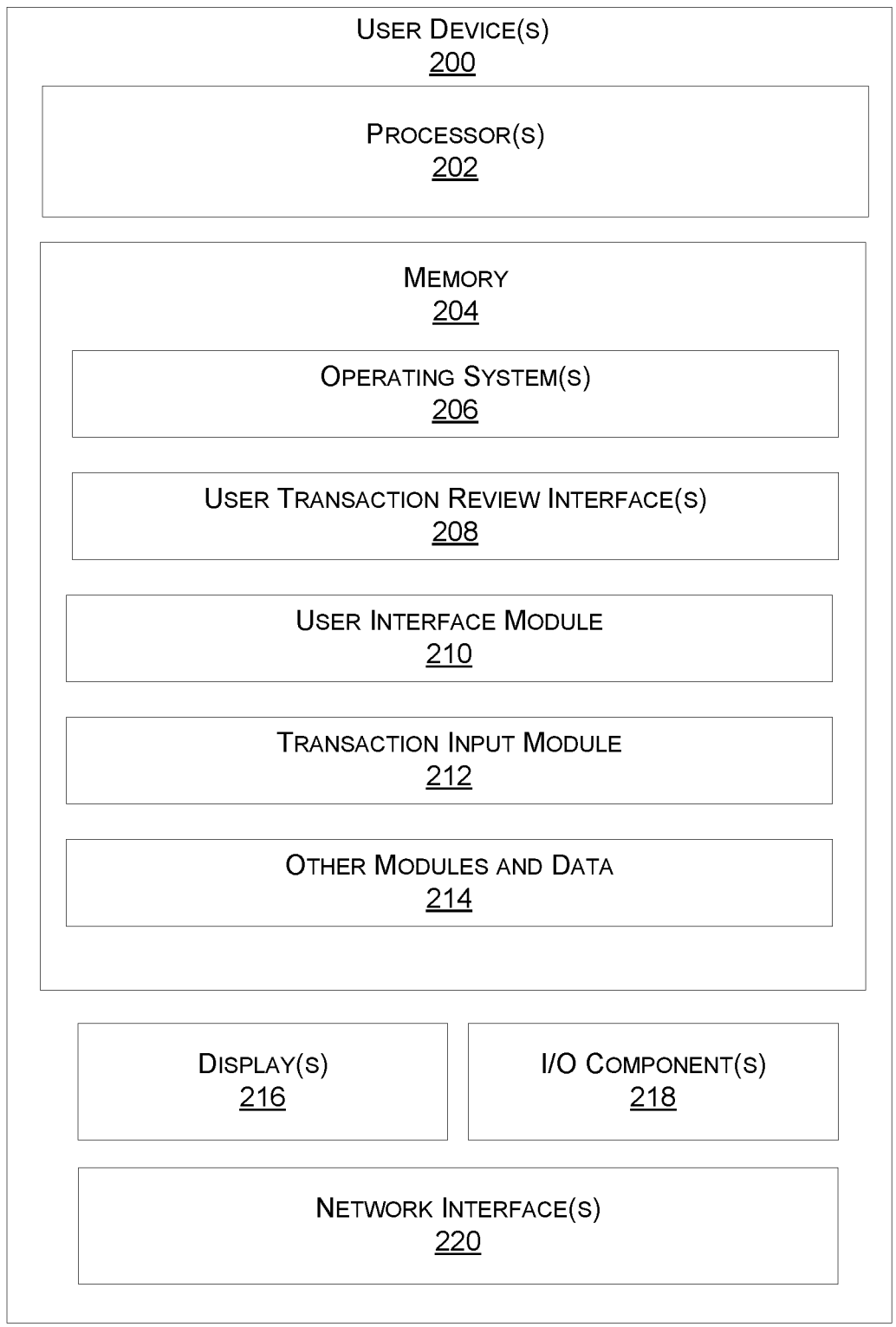
FIG. 2 illustrates a block diagram of select components of one or more example user device(s), as described herein.

FIG. 2 illustrates a block diagram of select components of one or more example user device(s) 200 (e.g., the user device 102 of FIG. 1), as described herein. The user device 200 can include one or more processors 202, memory 204, one or more operating systems 206, one or more user transaction review interface(s) 208, one or more user interface module(s) 210, one or more transaction input module(s) 212, other modules and data 214, one or more displays 216, one or more input/output (I/O) components 218, one or more network interface(s) 220, or any combination thereof.

Each processor 202 can itself include one or more processors or processing cores. For example, the one or more processors 202 can be implemented as one or more microprocessors, microcomputers, microcontrollers, digital signal processors, central processing units, state machines, logic circuitries, and/or any devices that manipulate signals based on operational instructions. In some examples, the one or more processors 202 can be one or more hardware processors and/or logic circuits of any suitable type specifically programmed or configured to execute the algorithms and processes described herein. The one or more processors 202 can be configured to fetch and execute computer-readable processor-executable instructions stored in memory 204.

Depending on the configuration of user device 200, memory 204 can be an example of computer storage media and can include volatile and nonvolatile memory and/or removable and non-removable media implemented in any type of technology for storage of information such as computer-readable processor-executable instructions, data structures, program modules or other data as discussed above. For example, memory 204 can include, but is not limited to, RAM, ROM, EEPROM, flash memory, solid-state storage, magnetic disk storage, optical storage, and/or other computer-readable media technology. Further, in some examples, user device 200 can access external storage, such as RAID storage systems, storage arrays, network attached storage, storage area networks, cloud storage, or any other medium that can be used to store information and that can be accessed by the one or more processors directly or through another computing device or network. Accordingly, memory 204 can include computer storage media able to store instructions, modules, or components that can be executed by the one or more processors 202. Further, when mentioned, non-transitory computer-readable media and computer storage media exclude media such as energy, carrier signals, electromagnetic waves, and signals per se.

The modules can include computer instructions/code that can be stored in the memory 204 and can be executable by the one or more processors 202.

Memory 204 can be associated with transitory computer-readable signals (in compressed or uncompressed form). Examples of computer-readable signals, whether modulated using a carrier or not, include, but are not limited to, signals that a computer system hosting or running a computer program can be configured to access, including signals downloaded through the internet or other networks.

Memory 204 can be used to store and maintain any number of functional components that are executable by the one or more processors 202. In some implementations, these functional components include instructions or programs that are executable by the one or more processors and that, when executed, implement operational logic for performing the actions and services attributed above to user device 200.

Furthermore, memory 204 can include one or more additional functional components, such as operating system 206 for controlling and managing various functions of user device 200 and for enabling basic user interactions. In addition, memory 204 can also store data, data structures and the like, that are used by the functional components.

Memory 204 can also include one or more user transaction review interface(s) 208. In some examples, user transaction review interface(s) 208 present transaction information or transaction data for user review. In examples, user transaction review interface(s) 208 can present manually uploaded transaction data for user review before the transaction data is transmitted or published to server.

Memory 204 can include one or more user interface module(s) 210. User interface module 210 can be maintained in memory 204 and executed on the processor(s) 202 to perform acts. The user interface module 210 can cause a user interface to be provided to a user on display(s) user device 200. In examples, the user interface module 210 can cause a user interface to be provided that allows a user to perform actions associated with the transaction management module 116 (e.g., via a mobile application associated with transaction management module 116). User interface module 210 of user device 200 can perform actions similar to user interface module 146 of the transaction management module 116.

In certain instances, user interface module 210 can be configured to provide a user interface that suits the particular user device 200 being used by the user. For example, information can be presented to the user in a different manner when presented on a mobile phone than when presented on a personal computer.

In some examples, a user interface can be provided to a user via a web browser (e.g., software as a service (SaaS)), via a downloadable client application, or both.

User interface module 210 can provide a summary view related to transaction management features.

Furthermore, memory 204 can include a transaction input module 212. The transaction input module 212 can be configured to enable receipt of transaction data in a variety of ways. The transaction input module 212 can be configured to enable input of transaction data that will be tracked by the transaction management module 116 and/or published by the financial social module 118. The transaction input module 212 can store received transaction data. In examples, the transaction input module 212 can cause transaction data to be stored in the memory 204. When the transaction input module 212 receives transaction data, the transaction input module 150 can provide the transaction data to the user via a user interface.

Depending on the type of user device 200, memory 204 can also optionally include other functional components and data, such as other modules and data 214. In examples, memory 204 can include applications provided by the transaction management platform or the financial social platform. Further, user device 200 can include many other logical, programmatic, and physical components, of which those described are merely examples that are related to the discussion herein.

I/O components 218 can be configured to allow a user to interface with the user device 200 via one or more I/O devices. The I/O components 218 can provide an interface for such devices as a display 216, speakers (not shown), a microphone (not shown), a keyboard (not shown), a mouse (not shown), a camera (not shown), an optical reader (not shown), a touchpad (not shown), a haptic output device (not shown) or any combination thereof.

In at least one example, user device 200 can include one or more displays 216. Depending on the type of computing device(s) used as user device 200, display 216 can employ any suitable display technology. For example, display 216 can be a liquid crystal display, a plasma display, a cathode ray tube (CRT) monitor, a light emitting diode display, an OLED (organic light-emitting diode) display, an electronic paper display, or any other suitable type of display able to present digital content thereon. In some examples, display 216 can have a touch sensor associated with display 216 to provide a touchscreen display configured to receive touch inputs for enabling interaction with a graphic interface presented on display 216. Accordingly, implementations herein are not limited to any particular display technology. Alternatively, in some examples, user device 200 may not include display 216, and information can be presented by other means, such as aurally.

One or more network interface(s) 220 can include one or more interfaces and hardware components for enabling communication with various other devices, such as over network(s) or directly. For example, network interface(s) 220 can enable communication through one or more networks, which can include, but are not limited to any type of network known in the art such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof, etc. A network can include both wired and/or wireless communication technologies, including Bluetooth®, BLE, Wi-Fi and cellular communication technologies, as well as wired or fiber optic technologies, etc. Components used for such communications can depend at least in part upon the type of network, the environment selected, or both. Protocols for communicating over such networks are well known and will not be discussed herein in detail.

Other components included in user device 200 can include GPS device (not shown) that is able to indicate location information. Further, user device 200 can include one or more sensors (not shown), such as an accelerometer, gyroscope, compass, proximity sensor, camera, microphone, and/or a switch, as discussed above. Additionally, user device 200 can include various other components that are not shown, examples of which include removable storage, a power source, such as a battery and power control unit, a printer, and so forth.

Example Follower Device(s)

Figure 3:
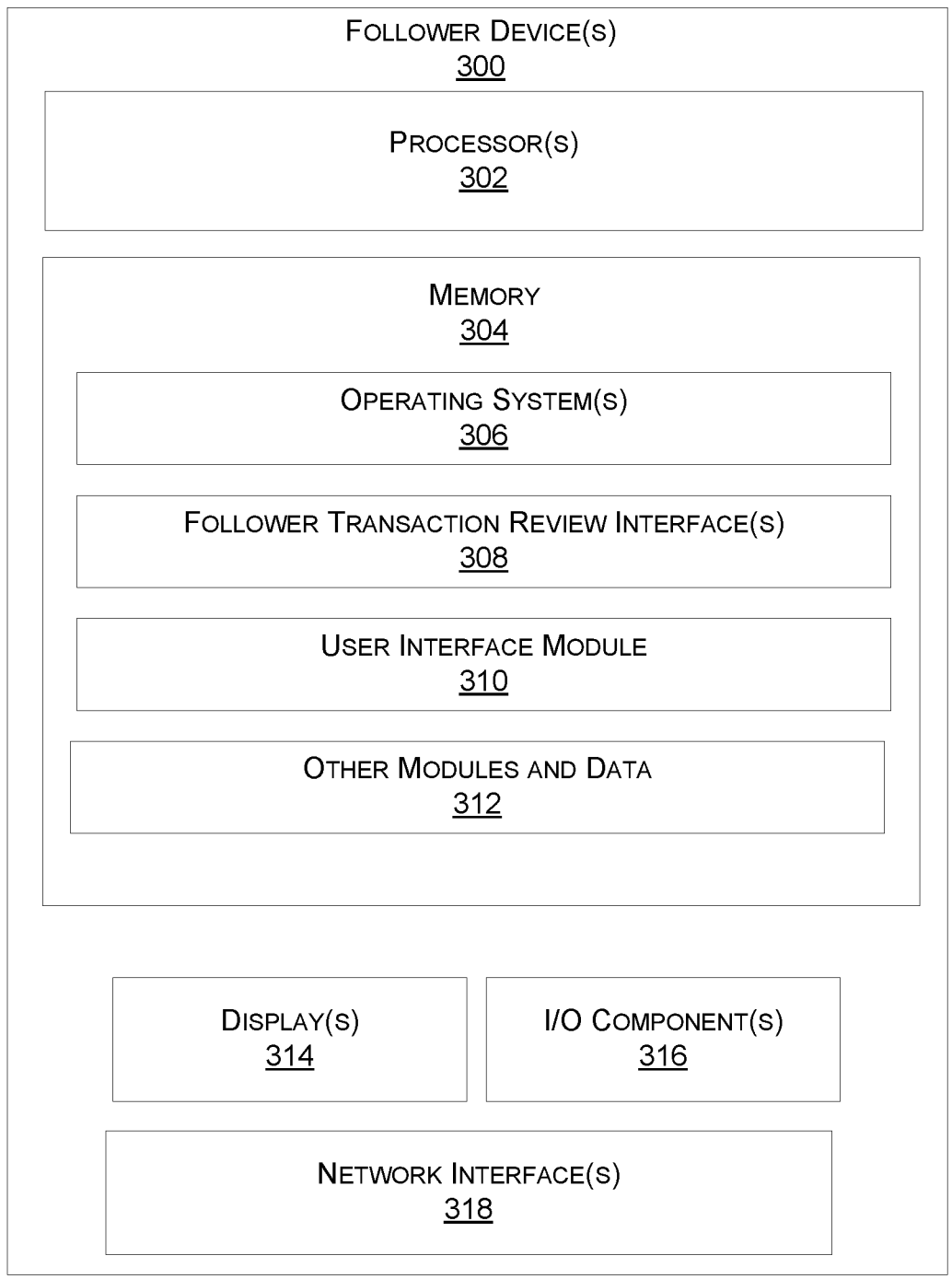
FIG. 3 illustrates a block diagram of select components of one or more example follower device(s), as described herein.
Figure 4A:
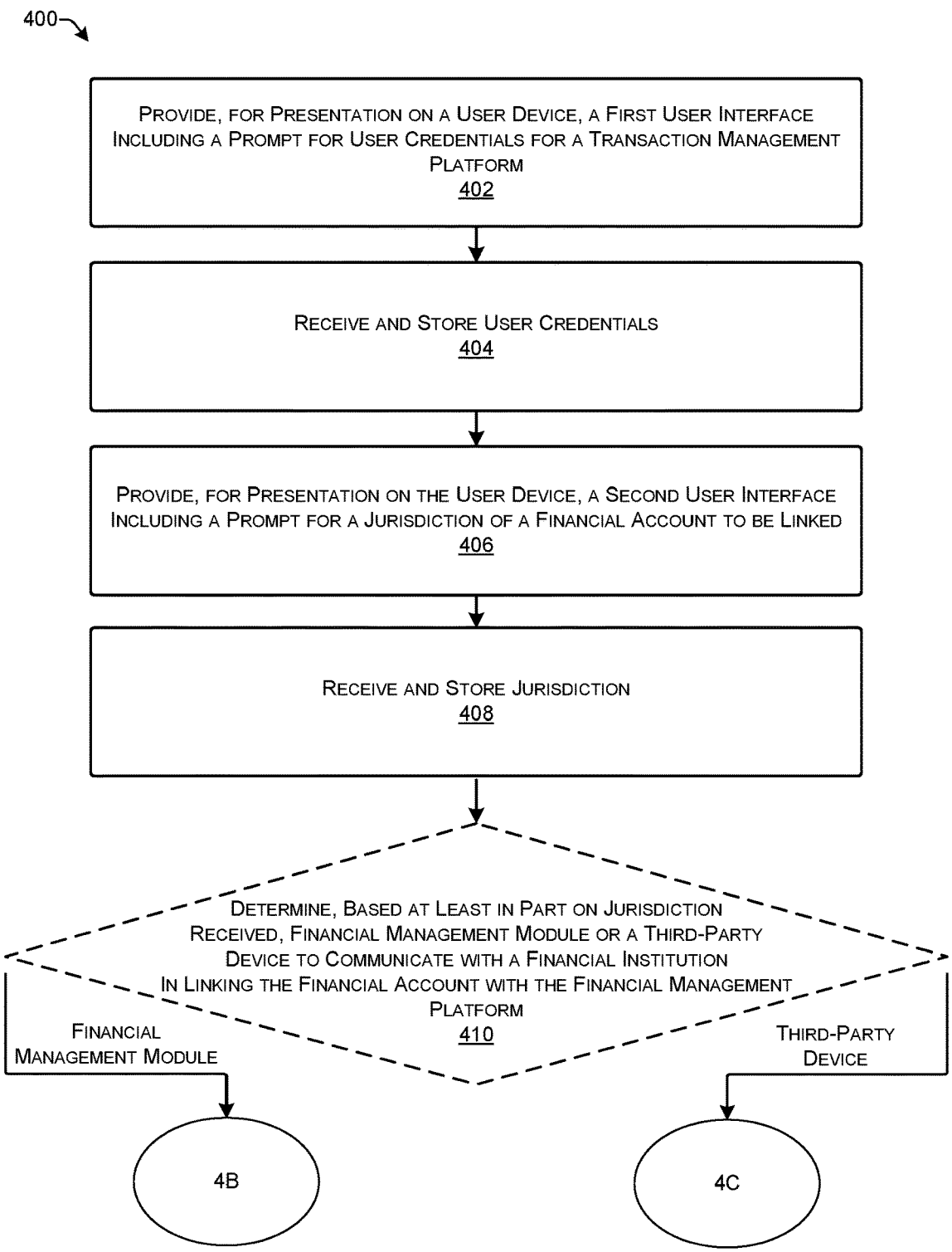
FIGS. 4A, 4B, 4C, 4D, and 4E are a flow diagram illustrating an example process for linking a financial account to a transaction management platform, as described herein.
Figures 4B, 4C:
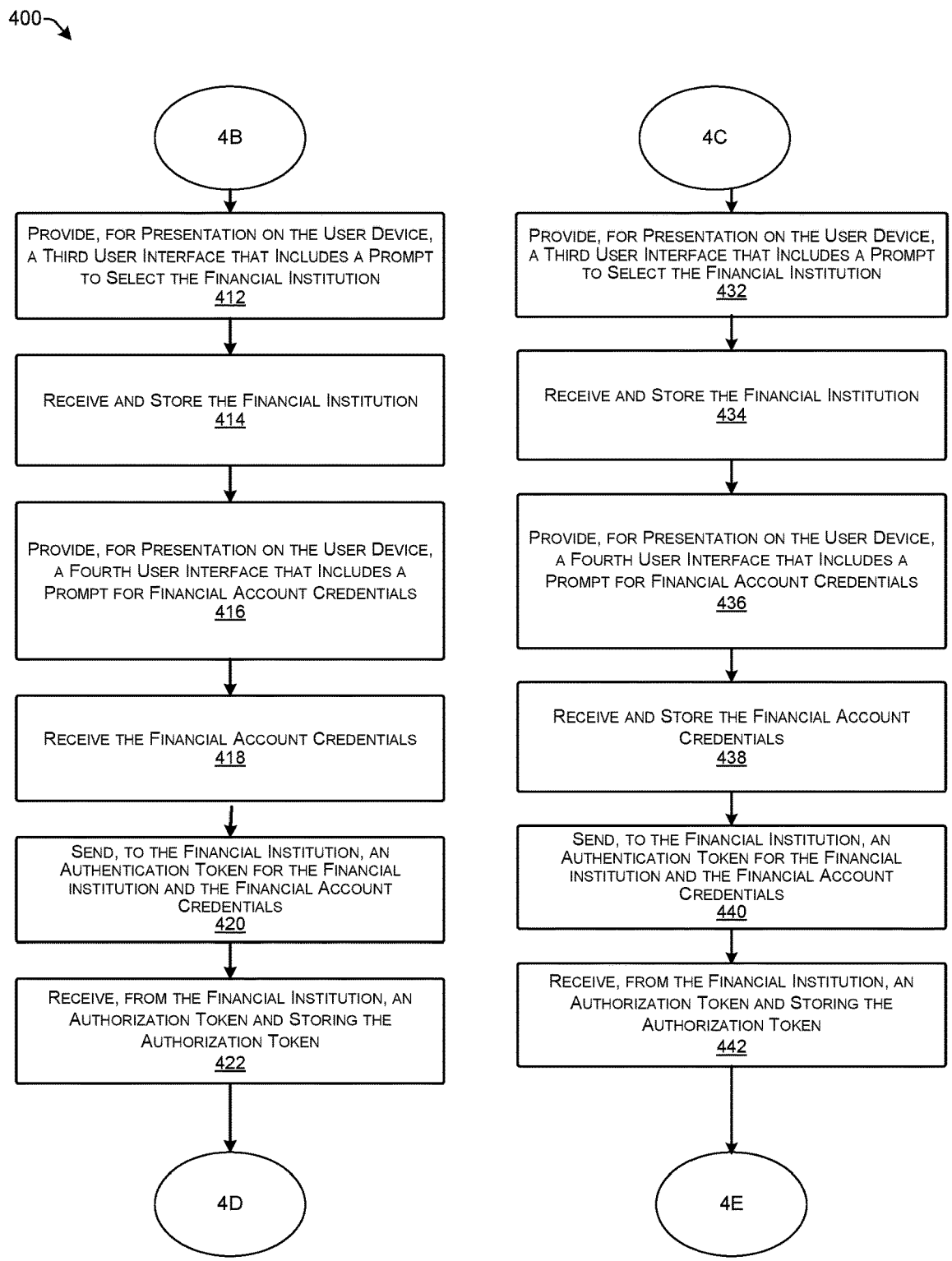
Figures 4D, 4E:
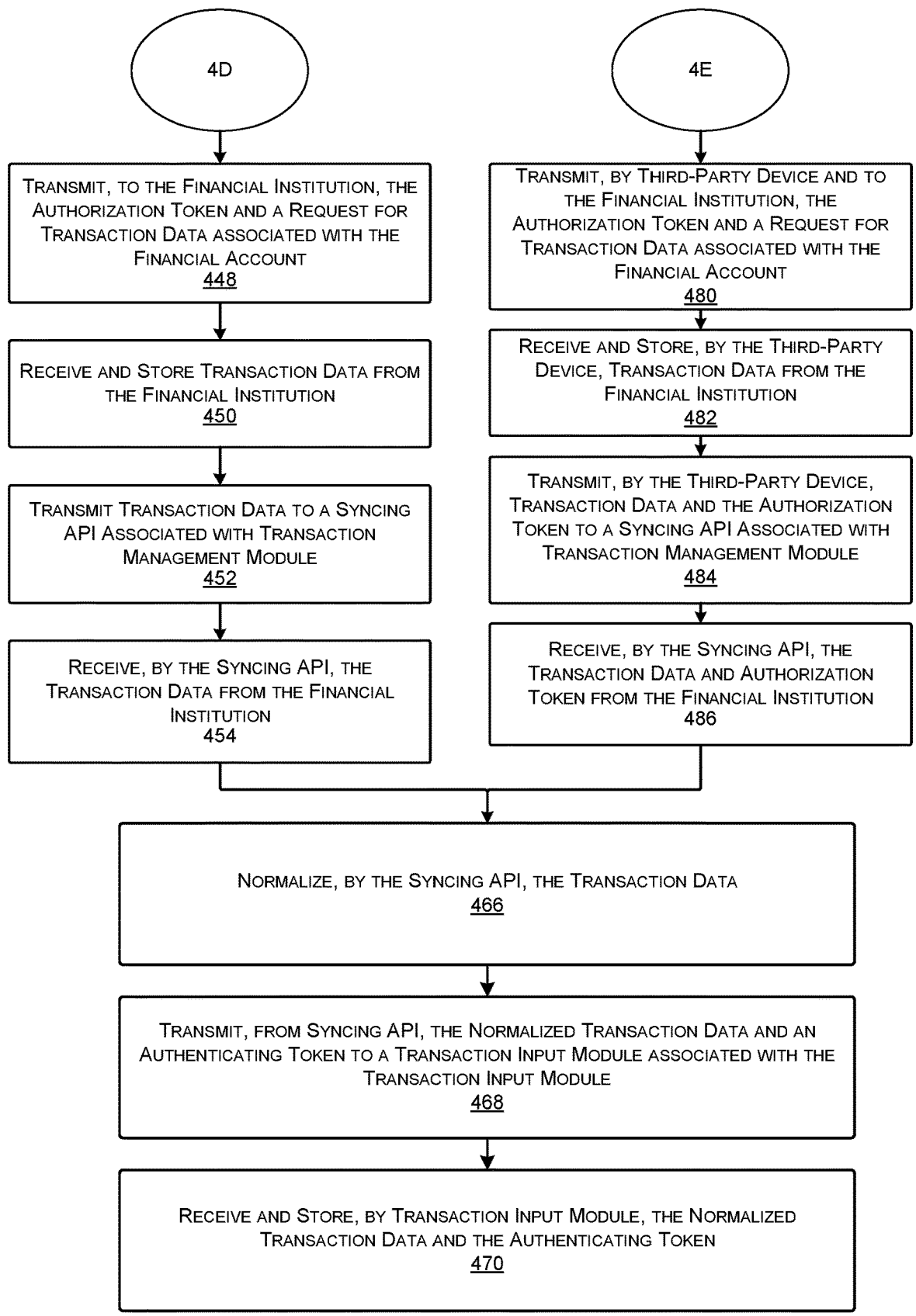

FIG. 3 illustrates a block diagram of select components of one or more example follower device(s) 300 (e.g., follower device 104(1)-104(N) of FIG. 1), as described herein. Follower device 300 can include one or more processors 302, memory 304, one or more operating systems 306, one or more follower transaction review interfaces 308, one or more user interface modules 310, other modules and data 312, one or more displays 314, one or more input/output (I/O) components 316, and one or more network interfaces 318, or any combination thereof.

Each processor 302 can itself include one or more processors or processing cores. For example, the one or more processors 302 can be implemented as one or more microprocessors, microcomputers, microcontrollers, digital signal processors, central processing units, state machines, logic circuitries, and/or any devices that manipulate signals based on operational instructions. In some examples, the one or more processors 302 can be one or more hardware processors and/or logic circuits of any suitable type specifically programmed or configured to execute the algorithms and processes described herein. The one or more processors 302 can be configured to fetch and execute computer-readable processor-executable instructions stored in memory 304.

Depending on the configuration of follower device 300, memory 304 can be an example of tangible non-transitory computer storage media and can include volatile and non-volatile memory and/or removable and non-removable media implemented in any type of technology for storage of information such as computer-readable processor-executable instructions, data structures, program modules or other data as discussed above. For example, memory 304 can include, but is not limited to, RAM, ROM, EEPROM, flash memory, solid-state storage, magnetic disk storage, optical storage, and/or other computer-readable media technology. Further, in some examples, follower device 300 can access external storage, such as RAID storage systems, storage arrays, network attached storage, storage area networks, cloud storage, or any other medium that can be used to store information and that can be accessed by the one or more processors directly or through another computing device or network. Accordingly, memory 304 can include computer storage media able to store instructions, modules, or components that can be executed by the one or more processors 302. Further, when mentioned, non-transitory computer-readable media and computer storage media exclude media such as energy, carrier signals, electromagnetic waves, and signals per se.

The modules can include computer instructions/code that can be stored in the memory 304 and can be executable by the one or more processors 302.

In addition, in some examples memory 304 can be associated with transitory computer-readable signals (in compressed or uncompressed form). Examples of computer-readable signals, whether modulated using a carrier or not, include, but are not limited to, signals that a computer system hosting or running a computer program can be configured to access, including signals downloaded through the internet or other networks.

Memory 304 can be used to store and maintain any number of functional components that are executable by the one or more processors 302. In some implementations, these functional components include instructions or programs that are executable by the one or more processors 302 and that, when executed, implement operational logic for performing the actions and services attributed above to follower device 300.

Furthermore, memory 304 can include one or more additional functional components, such as operating system 306 for controlling and managing various functions of follower device 300 and for enabling basic user interactions. In addition, memory 304 can also store data, data structures and the like, that can be used by the functional components.

Additionally, memory 304 can include one or more follower transaction review interface(s) 308 which, when executed by the processor 302, allows a follower to perform actions related to published transaction data. The actions can include one or more of viewing, following, sharing, commenting, expressing sentiments, sharing, saving, sorting, filtering, etc. Computer program code for the follower transaction review interface(s) 308 can be stored locally within follower device 300, provided across network 108.

Memory 304 can include one or more user interface module(s) 310. User interface module 310 can be maintained in memory 304 and executed on processor(s) 302 to provide information to the follower. In examples, the information can relate to the follower's membership with, or access to, the financial social network. The user interface module 310 can cause a user interface to be provided to a follower on display(s) 314 of follower device 300. In examples, the user interface module 210 can cause a user interface to be provided that allows a follower to perform actions associated with the financial social module 118 (e.g., via a mobile application associated with financial social module 118). User interface module 310 of follower device 300 can perform actions similar to user interface module 146 of the financial social module 118.

In certain instances, user interface module 310 can be configured to provide a user interface that suits the particular follower device 300 being used by the follower. For example, information can be presented to the follower in a different manner when presented on a mobile phone than when presented on a personal computer. In some examples, the user interface can be provided to a follower via a web browser (e.g., software as a service (SaaS)), via a downloadable client application, or both.

Depending on the type of follower device 300, memory 304 can also optionally include one or more other functional components and data, such as other modules and data 312, which can include programs, drivers, etc., and the data used or generated by the functional components. In examples, memory 304 can include applications provided by the transaction management platform or the financial social platform. Further, follower device 300 can include many other logical, programmatic, and physical components, of which those described are merely examples that are related to the discussion herein.

In at least one example, follower device 300 can include one or more displays 314. Depending on the type of computing device(s) used as follower device 300, display 314 can employ any suitable display technology. For example, display 314 can be a liquid crystal display, a plasma display, a cathode ray tube (CRT) monitor, a light emitting diode display, an OLED (organic light-emitting diode) display, an electronic paper display, or any other suitable type of display able to present digital content thereon. In some examples, display 314 can have a touch sensor associated with display 314 to provide a touchscreen display configured to receive touch inputs for enabling interaction with a graphic interface presented on display 314. Accordingly, implementations herein are not limited to any particular display technology. Alternatively, in some examples, follower device 300 may not include display 314, and information can be presented by other means, such as aurally.

I/O components 316 can be configured to allow a follower to interface with follower device 300 via one or more I/O devices. The I/O components 316 can provide an interface for such devices as display 314, speakers (not shown), a microphone (not shown), a keyboard (not shown), a mouse (not shown), a camera (not shown), an optical reader (not shown), a touchpad (not shown), a haptic output device (not shown) or any combination thereof.

Network interface(s) 318 can include one or more interfaces and hardware components for enabling communication with various other devices, such as over network(s) or directly. For example, network interface(s) 318 can enable communication through one or more networks, which can include, but are not limited to any type of network known in the art such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof, etc. A network can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Other components included in follower device 300 can include a GPS device (not shown) that is able to indicate location information. Further, follower device 300 can include one or more sensors (not shown), such as an accelerometer, gyroscope, compass, proximity sensor, camera, microphone, and/or a switch, as discussed above. Additionally, follower device 300 can include various other components that are not shown, examples of which include removable storage, a power source, such as a battery and power control unit, a printer, and so forth.

Linking an Entity's Financial Account to a User's Account with the Transaction Management Platform Techniques described herein enable a user to receive transaction data in real time or near real time, for one or more financial accounts.

Each user of the transaction management platform must create a global account on the transaction management platform. Each user can have multiple associated profiles, such a personal profile and a business profile of an entity with which the user is associated. Moreover, a user can be given access rights to other profiles. A user can create multiple thematic repositories (or Paybooks) within each of the user's associated profiles. A user can share as many or as few of these thematic repositories as the user wants and can select an audience with whom to share.

A user can also link financial accounts to the transaction management platform to enable the transaction management platform to receive transaction data from a financial institution.

FIGS. 4A, 4B, 4C, 4D, and 4E are a flow diagram illustrating an example process 400 for linking a financial account to a transaction management platform, as described herein.

Block 402 illustrates providing, for presentation on a user device, a first user interface including a prompt for user credentials for a transaction management platform. In examples, user interface module 146 of transaction management module 116 can provide the first user interface.

Block 404 illustrates receiving and storing the user credentials. The user credentials are associated with the user's account with the transaction management platform and can, if validated, provide user access to transaction data for one or more financial accounts. The transaction management module can receive the user credentials and store the user credentials, at least partly in response to receiving the user credentials via the first user interface. The transaction management module can cause the user credentials to be stored in the storage device 114 or in the memory 132.

Block 406 illustrates providing, for presentation on a user device, a second user interface including a prompt for a jurisdiction of a financial account to be linked. In some examples, the jurisdiction can be the location of the financial institution to which the account is associated, or, if the financial institution is multinational, the jurisdiction can be the jurisdiction in which the account was opened or is managed. In examples, a jurisdiction can be a country or other geographic or political region. In examples, user interface module 146 of transaction management module 116 can provide the first user interface. In various examples, the second user interface that provides the prompt for jurisdiction can be the same as the first user interface as described at Block 402 (e.g., additional information can be presented after the user credentials are validated) or can be another user interface. In examples, the jurisdiction of the financial account can be obtained by the transaction management module by other means than user entry to a user interface (e.g., from financial account information associated with the user's profile or otherwise stored by the system 120).

Block 408 illustrates receiving and storing the jurisdiction. The transaction management module can receive the jurisdiction and store the jurisdiction at least partly in response to receiving the jurisdiction. The transaction management module can cause the user credentials to be stored in the storage device 114 or in the memory 132.

Block 410 illustrates determining, based at least in part on the jurisdiction received, the financial management module or a third-party device to communicate with a financial institution in linking the financial account with the financial management platform. In examples, the transaction management module executes rules to determine, based at least in part on the jurisdiction received, whether a third-party or the financial management module will be used communicate with the financial institution for purposes of linking the account. In some examples, the transaction management module determines whether the third-party or the financial management module will be used based on additional or alternative attributes of the financial account than jurisdiction. In an example, the jurisdiction of a financial account is determined to be the United States. By application of the rules, the transaction management module determines that a third-party service will be used to interface with the financial institution. In examples in which more than one third-party service is potentially capable and available to perform the linking, the third-party service can be selected based on priority or can be selected manually by the user. When selected based on priority, the transaction management module can implement a fault tolerance system that prioritizes the third-party service based on, for example, latency, stability, cost, richness of data, etc. If a problem arises with the priority third-party service and/or third-party device, the next in line of priority can be used. In examples in which the financial management module is used for communicating with the financial institution, the transaction management module can act to obtain the further account information from the user.

Block 412 illustrates, in response to determining that the financial management module will communicate with the financial institution, providing, for presentation on a user device, a third user interface that includes a prompt to select the financial institution associated with the financial account. The transaction management module can provide the third user interface to the user device. In an example, the third user interface provides options, via one or more selectable graphical icon or via a text list, representing a plurality of financial institution. The third user interface can include a text field to receive a name of a financial institution, which can be autocompleted if the initial text string is recognized by the transaction management module. Other means of obtaining the identity of the financial institution are also possible (e.g., insertion of a URL for the financial institution, etc.).

Block 414 illustrates receiving and storing the financial institution. In Block 414, the transaction management module can receive, via the user interface, the user's selection of the financial institution, and the transaction management module can cause storage of the user's selection of the financial institution in the storage device 114 or in the memory 132.

Block 416 illustrates providing, for presentation on the user device, a fourth user interface that includes a prompt for financial account credentials. The fourth user interface can include a prompt for financial account credentials (e.g., account number, username, password, email address, etc.).

Block 418 illustrates receiving the financial account credentials provided. In Block 418, the transaction management module can receive, via the fourth user interface, the financial account credentials, Block 420 illustrates sending, to the financial institution, an authentication token for the financial institution and the financial account credentials.

Block 422 illustrates receiving, from the financial institution, an authorization token and storing the authorization token. Upon validation of the financial account credentials, the financial institution can send the transaction management module an authorization token corresponding to the financial account. In examples, the financial account authorization token can be stored in memory 132, storage device 114, or a syncing API associated with the transaction management module.

Block 448 illustrates transmitting, to the financial institution, the authorization token and a request for transaction data associated with the financial account. In examples, the transaction management module transmits the request, along with the financial account authorization token. In examples, a syncing API transmits the request and financial account authorization token to the financial institution. The request can be received by a sync application associated with the financial institution. The sync application associated with the financial institution can determine whether the financial account authorization token is correct. If the financial account authorization token is correct, the sync API associated with the financial institution can determine whether there are additional requirements (e.g., to answer a security question). If so, then the sync application can transmit a message to the transaction management module requesting additional information. The transaction management module can provide other user interfaces that include a prompt for additional information to meet the additional requirement. If authentication fails, the financial institution can transmit an error message to the transaction management module and the transaction management module can provide a notification via a user interface.

Block 450 illustrates receiving and storing transaction data from the financial institution. The transaction management module can also receive information about the financial account that can include one or more of an account name, account type, balance, etc. For a transaction represented in the transaction data, the transaction data can include one or more of a date of the transaction, a description of the transaction, an amount of the transaction, and the currency. The transaction management module can cause storage of the transaction data in the storage device 114 or in the memory 132.

Block 452 illustrates transmitting the transaction data to a syncing application programming interface (API) associated with the transaction management module.

Block 454 illustrates receiving, by the syncing API from the financial institution, the transaction data.

Block 466 illustrates normalizing, by the syncing API, the transaction data.

Block 468 illustrates transmitting, from the syncing API, the normalized transaction data and an authenticating token to the transaction input module associated with the transaction management module. Transmitting can occur based at least in part on the transaction management module querying the syncing API as to whether the syncing API has new transaction data. In examples, the normalized transaction data and an authenticating token are transmitted to the transaction input module.

Block 470 illustrates receiving and storing, by the transaction input module, the normalized transaction data and the authenticating token. The transaction input module receives the authenticating token and normalized transaction data by communicating with the third-party service device or by performing a handshake internally with the syncing API. The transaction input module causes the transaction data and the authenticating token to be stored, in examples, in the storage device 114 or in the memory 132.

Based at least in part on the transaction input module receiving the normalized transaction data, the transaction management module can notify the syncing API that the financial account has been linked and provide the syncing API information associated with the financial account (e.g., type of financial account, interface type, authenticating token, etc.). The syncing API can determine, based at least in part on rules associated with the transaction management module, the frequency with which the syncing API will attempt synchronization with the financial account and sends an indication of the frequency to the transaction management module.

Returning now to FIG. 4C, Block 432 illustrates providing, in response to determining at Block 410 that a third-party device will communicate with the financial institution, a third user interface, for presentation on a user device, that includes a prompt to select the financial institution associated with the financial account. A third-party device provides the third user interface to the user device. In examples, the transaction management module opens a web page, and the web page opens a widget provided by the third-party device. The widget communicates directly to the third-party device. The third-party device can provide one or more third-party user interface(s) for at least some interactions with the user device (e.g., to obtain additional financial account information such as account number, credentials, etc.). In an example, the third user interface provides options, via one or more selectable graphical icon or via a text list, representing a plurality of financial institution. The third user interface can include a text field to receive a name of a financial institution, which can be autocompleted if the initial text string is recognized by the third-party device. Other means of obtaining the identity of the financial institution are also possible (e.g., insertion of a URL for the financial institution, etc.).

Block 434 illustrates receiving and storing the financial institution. In Block 434, the third-party device receives, via the third user interface, the user's selection of the financial institution with which the financial account is associated.

Block 436 illustrates providing, for presentation on the user device, a fourth user interface that includes a prompt for financial account credentials. The third-party device provides, for presentation on a user device, a fourth user interface that includes a prompt for financial account credentials (e.g., account number, username, password, email address).

Block 438 illustrates receiving and storing the financial account credentials provided. The third-party device can receive and store the financial account credentials received in response to the prompt described at Block 436.

Block 440 illustrates sending, to the financial institution, an authentication token for the financial institution and the financial account credentials.

Block 442 illustrates receiving, from the financial institution, an authorization token and storing the authorization token. Upon validation of the financial account credentials, the financial institution can send the third-party device an authorization token corresponding to the financial account and the third-party device can store the authorization token.

Block 480 (FIG. 4E) illustrates transmitting, by the third-party service to the financial institution, the authorization token and a request for transaction data associated with the financial account. In examples, the third-party device transmits the request, along with the authorization token. The request can be received by a sync application associated with the financial institution. The sync application associated with the financial institution can determine whether the authorization token is valid. If the authorization token is valid, the sync application associated with the financial institution can determine whether there are additional requirements (e.g., to answer a security question). If so, then the sync application can transmit a message to the third-party device requesting additional information. The third-party device can provide other user interfaces that include a prompt for additional information to meet the additional requirement. If the financial institution determines that the authorization token is not valid, the financial institution can transmit an error message to the third-party device and the third-party device can provide a notification via a user interface.

Block 482 illustrates receiving and storing, by the third-party device, transaction data from the financial institution. The third-party device can store the transaction data in storage local to the third-party service. The third-party device can also receive information about the financial account that can include one or more of an account name, account type, balance, etc. For a transaction represented in the transaction data, the transaction data can include one or more of a date of the transaction, a description of the transaction, an amount of the transaction, and the currency.

Block 484 illustrates transmitting, by the third-party device, the transaction data and the authorization token to a syncing application programming interface (API) associated with the transaction management module.

Block 486 illustrates receiving, by the syncing API from the financial institution, the transaction data and the authorization token.

From Block 486, the process continues to Blocks 466, 468, and 470, as described above.

Updating Transaction Data

Once the financial account has been linked to the transaction management platform, the syncing API can receive transaction data from the financial account and can periodically update the transaction data.

Figure 5:
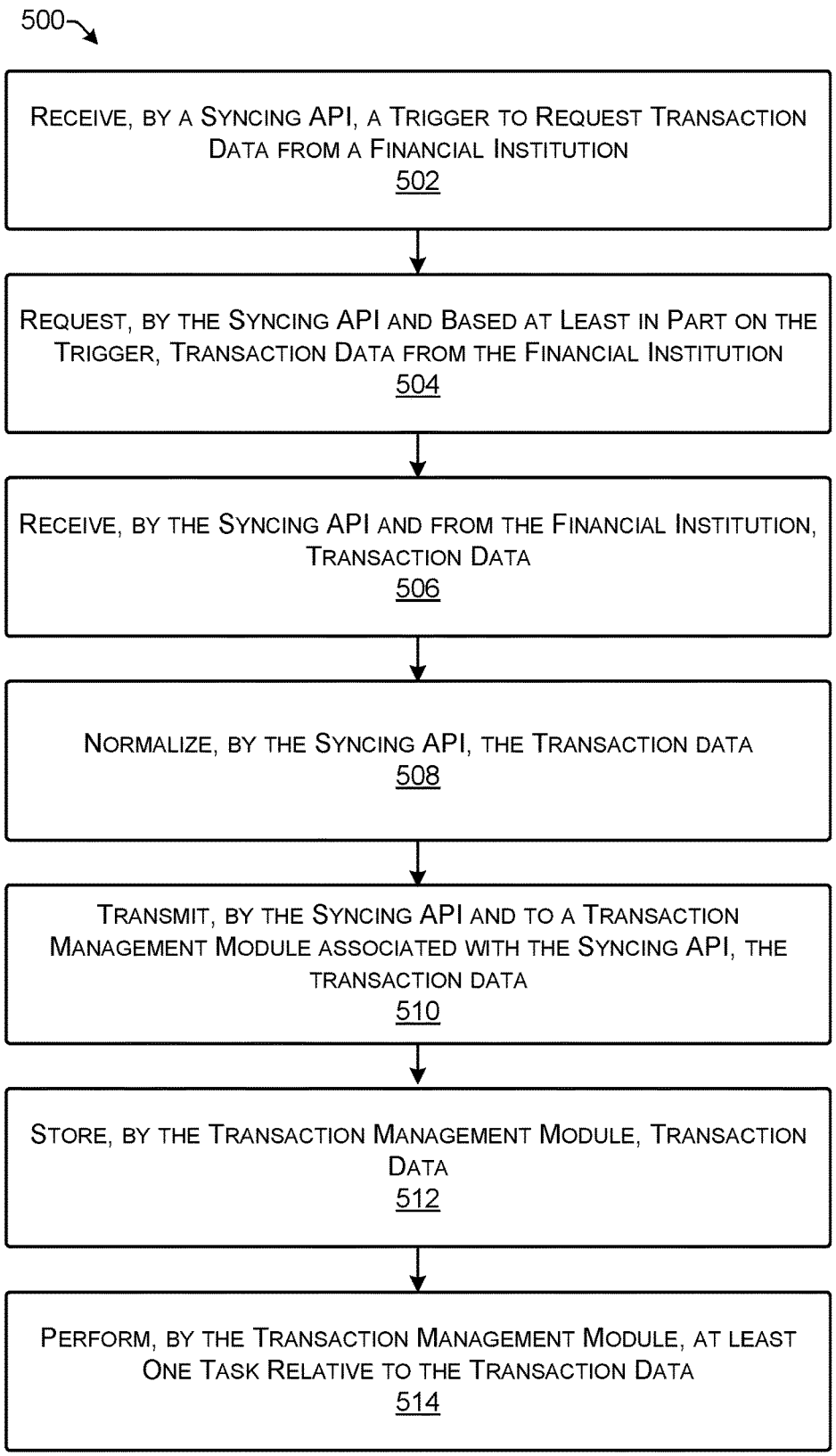
FIG. 5 is a flow diagram illustrating an example process for updating transaction data for a linked financial account, as described herein.

FIG. 5 is a flow diagram illustrating an example process 500 for updating transaction data for a linked financial account, as described herein.

Block 502 illustrates receiving, by a syncing API, a trigger to request transaction data from a financial institution. The transaction data can be associated with a financial account at the financial institution. The trigger can include user instructions (e.g., via a user interface presented by the transaction management module) to update the financial account. Upon receipt of the user instructions, the transaction management module can send instructions to the syncing API to request the transaction data. Additionally or alternatively, the trigger can be an update task in a work queue associated with the syncing API. Additionally or alternatively, the trigger can be the outcome of a rule that dictates when transaction data for certain classes, accounts, users, or data should be updated. A rule can be based at least in part by limits set by financial institutions regarding the maximum frequency or amount of transaction data release from the financial institutions (e.g., once a day, once every five minutes, 500 transactions a day, etc.). Rules can additionally or alternatively be based on, for example, location of the financial institution and/or user settings.

In some instances, transaction data can be obtained from a financial institution in a real-time or substantially real-time frequency, i.e., at or near the time a transaction occurs. Additionally or alternatively, rules can be configured to receive transaction data from a financial institution upon the financial institution issuing a financial institution statement for the financial account.

When a task or rules are used, a timed process can be used to determine whether and/or when the syncing API should check for updates to the transaction data. In examples, the transaction management module can add a task to a work queue of the syncing API when a user renews an account with the transaction management platform. In examples, after expiration of a user account with the transaction management platform, no updates of data for the account are performed. If the account with the transaction management platform is no longer being updated, the transaction management module can notify the user, for example, by email, text, or flag or a message on the user interface, etc.

Additionally, in examples, a third-party service device can support a call back function, which pushes transaction data to the syncing API.

Block 504 illustrates, requesting, by the syncing API and based at least in part on the trigger, transaction data from the financial institution. In examples, the requesting process can be similar to that described in relation to FIG. 4.

Block 506 illustrates receiving, by the syncing API and from the financial institution, the transaction data. In examples, the receiving process can be similar to that described in relation to FIG. 4.

Block 508 illustrates normalizing, by the syncing API, the transaction data. In examples, the normalizing process can be similar to that described in relation to FIG. 4.

Block 510 illustrates transmitting, by the syncing API and to a transaction management module associated with the syncing API, the transaction data. In examples, the transmitting process can be similar to that described in relation to FIG. 4.

Block 512 illustrates storing, by the transaction management module, the transaction data. In examples, the storing process can be similar to that described in relation to FIG. 4.

Block 514 illustrates performing, by the transaction management module, at least one task relative to the transaction data. The transaction management module, based at least in part on receipt of the transaction data and can perform at least one of the following tasks automatically: categorization of one or more transactions, assignment of one or more transactions to a specific account, formatting the transaction data, normalizing the transaction data, publishing the transaction data, or aggregating the transaction data, some of which are described below.

In examples in which a third-party service is used to communicate with the financial institution, the third-party device can receive a public access key from the financial institution. In examples, the third-party device can request that a session be opened and provide the financial institution the financial account credentials and the public access key. The financial institution can provide the third-party device with a connection token. The third-party device can store the connection token and receive a connection to the financial institution. The transaction management module can receive the connection token from the third-party device and can store the connection token. The transaction management module can provide the connection token to the third-party device when transaction data is requested, and can receive transaction data via the third-party device.

Categorization and Summarization of Transaction Data

The transaction management module can augment transparency of transaction data by automatically categorizing and/or summarizing transaction data. In examples, tasks the transaction management module can perform on transaction data include categorizing and/or summarizing transaction data. By applying rules to transaction data, the transaction management module can associate individual transactions with one or more categories of one or more category types, and can group transactions by one or more categories. In some examples, the categories can be hierarchical. Additionally or alternatively, transaction data can be manually categorized and/or summarized. For example, users can manually tag one or more transactions with categories, before or after automatic categorization, or without automatic categorization.

Figure 6:
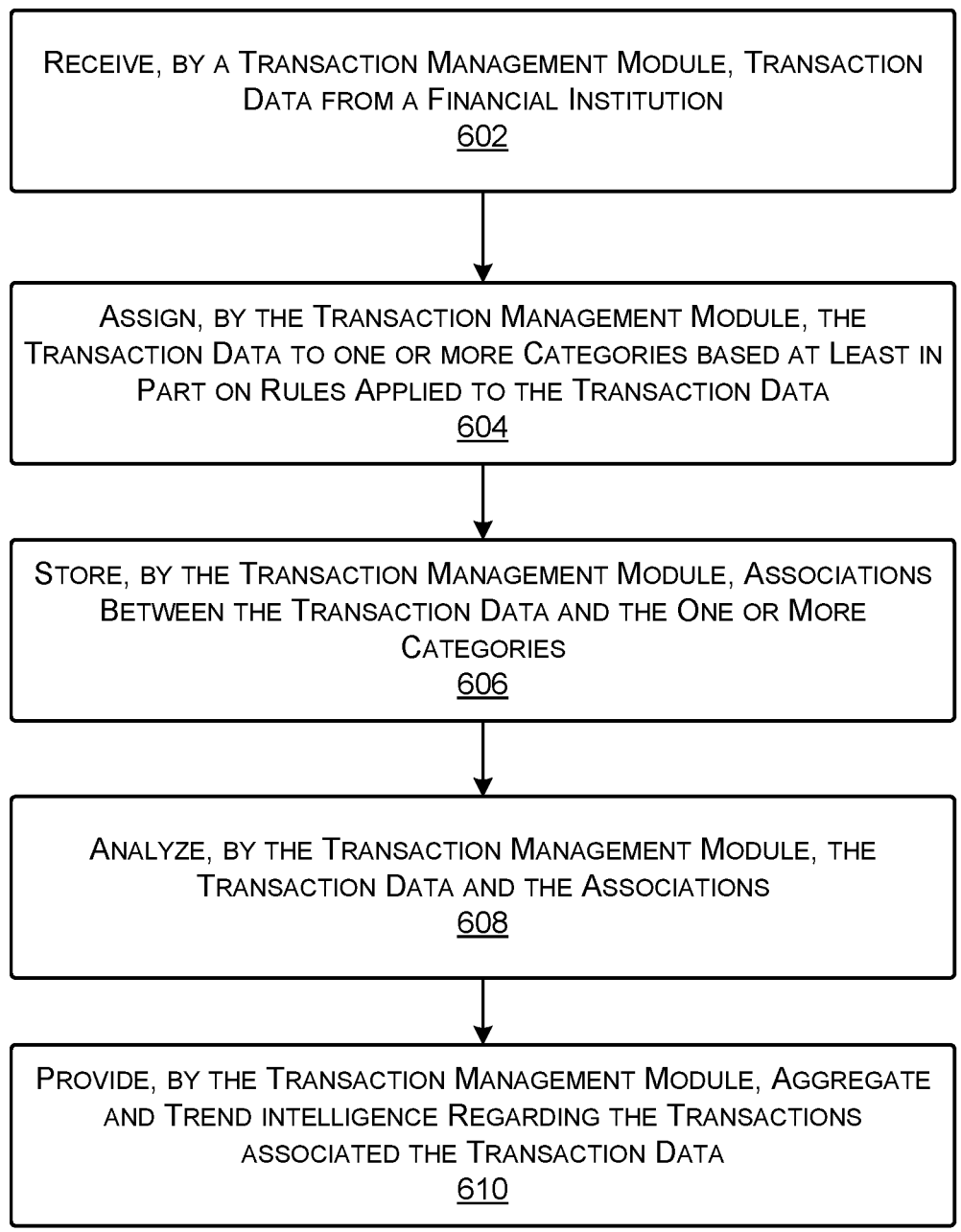
FIG. 6 is a flow diagram illustrating an example process for categorizing and summarizing transaction data for a linked financial account, as described herein.

FIG. 6 is a flow diagram illustrating an example process 600 for categorizing and summarizing transaction data for a linked financial account, as described herein.

Block 602 illustrates receiving, by the transaction management module, transaction data from a financial institution server. In an example, the receiving process can be similar to that described in relation to FIG. 5.

Block 604 illustrates assigning, by the transaction management module, the transaction data to one or more categories based at least in part on rules the transaction management modules applies to the transaction data. The transaction data can include data and metadata. The transaction management module can analyze characteristics of the transaction data with regard to a set of rules. A category can be based on a characteristic of the transaction, for example, a geocode, vendor, project, amount, date, historical categorization, expense type, employee, etc. In an example, a transaction can be categorized into one or more categories for each of one or more different category types, such as transactions occurring in 2018, occurring in Texas, being associated with a utility provider, and/or being for an amount greater than $1,000. A non-limiting example of a rule might require that a transaction be categorized as "Office Supplies" if the vendor is identified as "Office Station." As another non-limiting example, a rule might indicate that a transaction be categorized as "$100 to $999" if the transaction amount is $500.

In some examples, rules can be learned by a machine learning mechanism. In examples, the transaction management module can be configured to automatically categorize transactions based on categorization of historical transactions (and trends observed therefrom). The rules can also be customized based on parameters including, but not limited to, the entity, the user, the time of the day, the location of the transaction, etc.

In at least one example, the transaction management module can train and store data model(s), for instance in the other modules and data 136. In at least one example, data model(s) can be trained utilizing machine learning mechanisms in which input data relates to historical categorization of transactions. The historical categorizations can have been automatically or manually selected. The input data can include descriptive data indicative of characteristics of the historical transactions and indications of whether categories were overridden by the user. The data model(s) can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. For a particular transaction, a trained data model can output a similarity score indicative of whether the particular transaction is similar to transactions of a certain category. If the similarity score meets or exceeds a threshold similarity score (e.g., showing that the particular transaction is more similar to categorized transactions for the certain category), transaction management module can automatically assign the transaction to that certain category. If the similarly score is below the threshold similarly score, the transaction can be left uncategorized, at least as to the category type being analyzed (e.g., location of transaction). The machine learning mechanism can learn the similarity metric and the threshold similarity score. Automatic categorizing of transactions increases the rate at which transaction data can be published and increases the value to followers of the transaction data.

Block 606 illustrates storing, by the transaction management module, associations between the transaction data and the one or more categories. The transaction management module can indicate categories using graphical icons presented adjacent to a published transaction record on a user interface on a user device and/or a follower device. A user or follower can also request that one or more categories associated with transactions be presented via selection of a particular transaction record. The transaction management module can also sort transactions by category (in addition to sorting by date, payee, amount, etc.). Classification can facilitate proposed general ledger (GL) coding for the transaction data, which can be manually adjusted if desired. If a rule exists, the transaction management module can apply the rule to transaction data to automatically categorize a transaction.

Block 608 illustrates analyzing, by the transaction management module, the transaction data and the associations. Based at least in part on assigning categories to transaction data, the transaction management module can analyze transactions to provide additional intelligence and trends regarding the published transaction. In examples, the transaction management module can generate information related to how many (and which) transactions occurred within a time period (e.g., one month, one year, etc.), how many transactions are in a given category (e.g., 100 transactions over $1,000, 2 international transactions, etc.), correlations between job position and expenditure (e.g., managers tend to spend three times per month than salespeople), and/or the increase in marketing expenses by an entity year over year.

Block 610 illustrates providing, by the transaction management module, aggregate and trend intelligence regarding the transactions associated with the transaction data.

Aggregate and trend intelligence can be provided via a user interface presented on a follower device and/or user device. A user interface can include a data graphics/analytics area. In examples, the data graphics area can include any type(s) of data graphic(s) suitable for reporting transaction data in a manner useful or desired by the user or follower. A non-exhaustive list of data graphics types may include pie charts, bar graphs, line graphs, pictographs, tables, or any combination thereof. A user interface presented on the follower device or user device can include a search bar. A follower or user can search through transaction data via the search bar. Additionally or alternatively, a follower or user can search and/or navigate through transaction data in any suitable manner, such as by using drop-down selected filters, radio button selected filters, voice commands and/or a tag cloud. Additionally or alternatively, a user interface presented on the follower device or user device can include a notification area. The notification area can provide information to a follower or user about transactions. For example, a notification can be presented upon receipt of new transaction data from a financial institution server or upon an indication that earlier data has changed.

Thus, techniques described herein can provide entities, followers, users, stakeholders, auditors, other interested parties, and/or the public with additional value, beyond the basic details about of transactions, via summarization, aggregation, categorization, and other analysis, which may not otherwise be able to be performed or performed cost effectively.

Monitoring Changes to Transaction Data

Additionally or alternatively, the transaction management module can assess the integrity of transaction data. In examples, the transaction management module can monitor the transaction data for deletions or alterations that occur after initial receipt of the transaction data.

Figure 7:
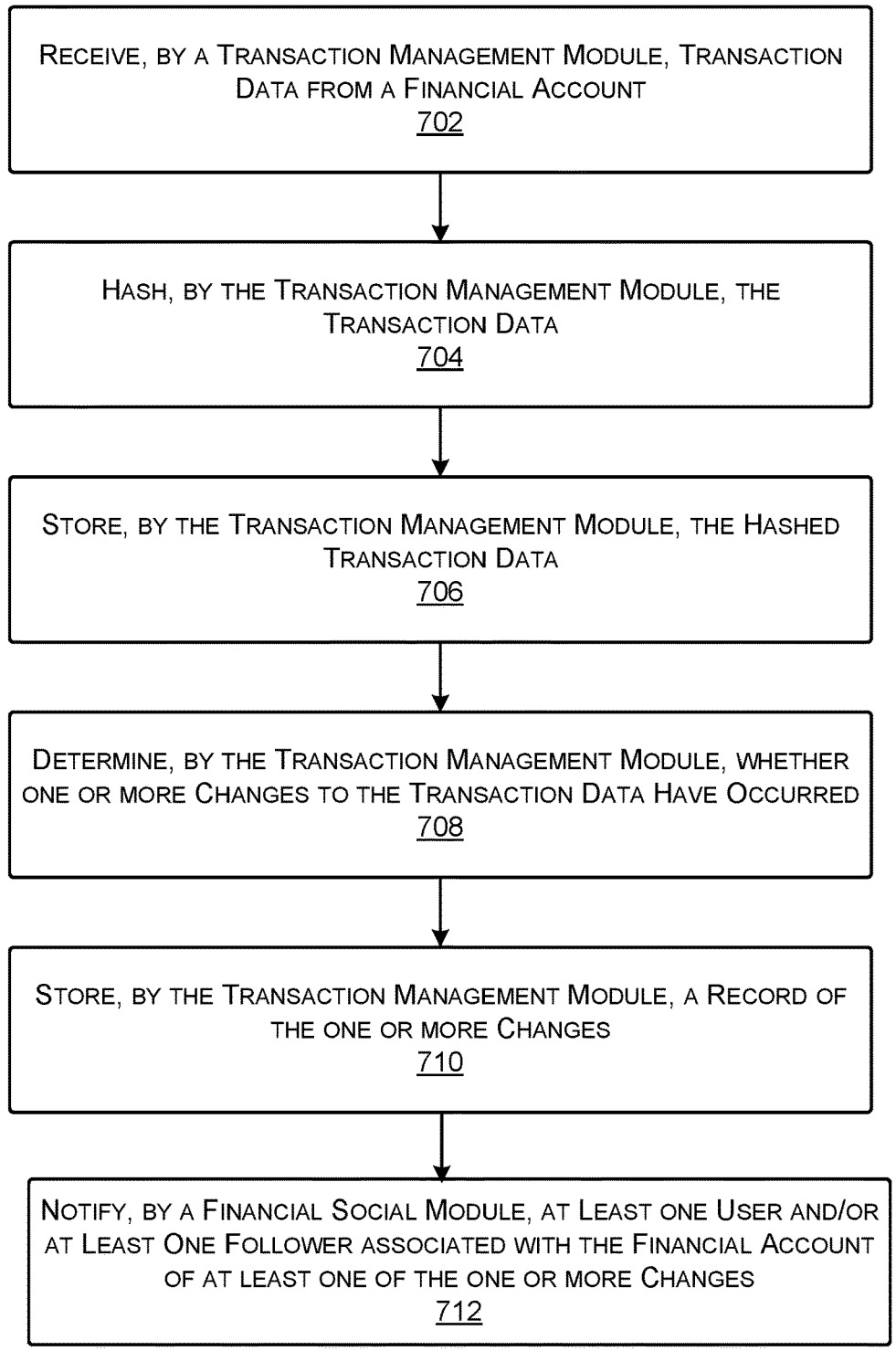
FIG. 7 is a flow diagram illustrating an example process for determining whether transaction data has been changed or deleted after receipt from a financial institution, as described herein.

FIG. 7 is a flow diagram illustrating an example process 700 for determining whether transaction data has been changed or deleted after receipt from a financial institution, as described herein.

Block 702 illustrates receiving, by a transaction management module, transaction data from a financial account. In examples, the transaction data can be received directly from the financial account (e.g., not by manual entry or through other platforms, persons, or institutions (excluding the third-party service as described above). The transaction data is accurate to the extent the financial institution's records are accurate, at least in part because of the automated, direct nature of transmission of the transaction data to the transaction management module.

Block 704 illustrates hashing, by the transaction management module, transaction data. In examples, the transaction management module applies a hashing algorithm to the transaction data to create an irreversible fixed-length hash value for the transaction data that can be a fingerprint of the particular data. The hash value allows a determination of whether later transaction data maps onto the hash value, but if the later data is unknown it can be difficult to reconstruct it (or any equivalent alternatives) by knowing the stored hash value. At least in this way, hashing ensures the integrity of the transaction data.

Block 706 illustrates storing, by the transaction management module, the hash value. In examples, the hash value can be stored using blockchain technology. Blockchain technology creates an immutable record of transaction data so that any changes to the transaction data can be detected.

Block 708 illustrates determining, by the transaction management module, whether one or more changes to the transaction data have occurred. A change can be determined by the transaction management module by hashing both the transaction data and the transaction history and storing this information on the blockchain. When a change to the transaction data occurs, the transaction management module initiates a process that inputs the current transaction data and the previous transaction hash for the corresponding transaction data, and creates a new hash value. The new hash value can be put on the blockchain, and keyed to the transaction identifier (I.D.). Thus, the change can be recorded and accessible. In examples, a user can select the indicator or a link in a notification and view details of the changes that have occurred. Additionally or alternatively, a user can look up on the public blockchain using the blockchain hash code to check if the transaction data is authentic. The user can compare the published transaction data to the blockchain record.

Block 710 illustrates storing, by the transaction management module, a record of the one or more changes.

Block 712 illustrates notifying, by the transaction management module, at least one user or follower associated with the financial account of at least one of the one or more changes. In examples, based at least in part on detecting deletions or changes, the transaction management module can notify users and/or and followers with whom the data, account, profile, repository, etc. has been shared or published. In examples, the notification can be a direct notification (e.g., email, mail, phone, text, etc.) or a display of an indicator associated with the published transaction data or transaction (e.g., a flag presented next to a transaction in a list of transactions for a financial account presented via user interface).

At least because of the monitoring of data that the transaction management module performs, the transaction management module can generate a bonded certificate of authenticity that certifies the accuracy, veracity, and/or completeness of published transaction data in comparison to the transaction data originally obtained from the financial institution. The certificate can be generated to certify specific transactions or can be provided for entire accounts or profiles. The certificate can be provided to individual users or entities upon request or can be published along with the transaction data. The certificate can be updated, or a new certificate generated, periodically or upon receiving an indication that there is new or changed transaction data.

In additional or alternative examples, the transaction management module can generate transparency ratings or levels for entities, users, accounts, profiles, etc. In an example, the transparency ratings can be determined objectively at least on the basis of the percentage of all associated accounts or total transaction data that is being published. The transaction management module can generate ratings in numbers (e.g., 85% transparent, 68% transparent, etc.), grades (e.g., A, B, C, D, F), categories (e.g., gold, silver, bronze, etc.), etc. A graphical icon associated with the rating can be presented in conjunction with transaction data, a profile, a transaction management account, a financial account, etc. and can be selectable to present the reasons for the rating.

Publication of Transaction Data

In at least one application, the transaction management module can cause transaction data to be shared and/or published. The shared or published data can be associated with one or more financial accounts, one or more thematic repositories, and/or all or part of a financial profile itself, whether that profile is a business profile for a business with which the user is associated, or a personal profile or entity profile. The account(s), profile(s), or thematic repositor(ies) of the plurality of thematic repositories can be published such that at least a subset of the corresponding transaction data can be accessible to multiple users via one or more user accounts, accessible by multiple followers, or can be accessible to subsets or the entirety of the public. In some examples, a person can publish some data without having a user account with the transaction management platform.

A profile can include one or more of identifying information about the associated entity, an overview of transaction data and trends, a list of transactions of an entity, and/or the thematic repositories themselves (which also incorporate financial accounts).

A user can grant various permissions for followers to at least one of view, follow, share, comment, express sentiments, share, save, sort, or filter transaction information on the individual transactions that are shared or published, or the financial accounts from which the transaction data is published, or the entity.

In order to access the published information, a follower may be required to have their own global account with the transaction management platform, the financial social network, or, alternatively, the follower may not need to have an account with either (e.g., when the published information is made public).

Publication can serve to make transaction data accessible to followers and available for followers to analyze, critique, or share, thus increasing the financial transparency of the entity and the transaction data. For instance, a nonprofit organization may desire or be required to publish financial activities and data for purposes of increasing transparency.

In some examples, the transaction management module can apply different permission levels to followers of published transaction data. Permission levels can define which transaction data, and/or the granularity of transaction data, that a follower can access, view, share, edit, etc.

The transaction management module can assign permission levels to followers by applying rules (or by implementing user requests) to classify the followers based at least in part on the followers' characteristics. In examples, the followers' characteristics can be based at least in part on one or more of profile information from a profile of the follower on the transaction management platform, and/or the financial social network, and/or publicly available information, other information provided by the follower to the transaction management platform, information provided by the authorized user, or information provided by the entity. Additionally or alternatively, the characteristics and/or permission levels can be input by a user.

In examples, the transaction management module can apply rules (or implement user requests) to classify followers by their relationship to the entity or user (e.g., Board member, employee, management, shareholder, etc.). A follower can be classified in multiple classes (e.g., shareholder and employee), and can be classified in different classes for different entities/users. Each class can be associated with a permission level with respect to the transaction data (e.g., via rules, permissions matrix, etc.). In an example, a Board member is assigned a high permission level that has full access to all transaction data that has been published by the user, at the most granular level. In the example, a member of the public is assigned the lowest permission level, and the lowest permission level has view access to only summary information based on categories, as described above. For example, the lowest permission level can be configured to only be able to view a dollar amount for total monthly expenditures of an entity and not the individual transactions that comprise that amount.

In another example, a church is the entity. In the example, the church is involved in three legal disputes. Permissions are established such that (1) the pastor and finance committee of the church can see all transactions and other information for legal fees, but (2) the parishioners of the church can only see summarized data regarding legal fees (e.g., how much is spent on legal fees in total, but not details about any particular dispute such as how much was paid to a certain attorney or name of subcategory of legal fees that would identify a parishioner as the plaintiff).

A follower can request higher permissions that the follower is currently assigned. In examples, the transaction management module receives the request for increased permissions, notifies the user of the request, receives the user's response, and applies changes to the permissions or permission level for the follower if the request is approved.

The transaction management module can change or override classes and permissions based on user request, profile changes, etc.

Additionally or alternatively, the transaction management module can grant certain followers permissions to modify additional information associated with the transaction data. For example, a follower can be allowed to change a description of a payee or change a categorization of a transaction. However, modification of the underlying raw transaction data can trigger one or more of the consequences described above (e.g., notification, flagging, change to the blockchain, etc.)

By classifying both followers and transactions, the techniques described herein make raw transaction data actionable in different ways by different people. An entity can be open about their finances to everyone, but customize, per financial account and per follower, the granularity of the transaction data that is presented.

Providing Additional Information About Transaction Data Changes

Figure 8:
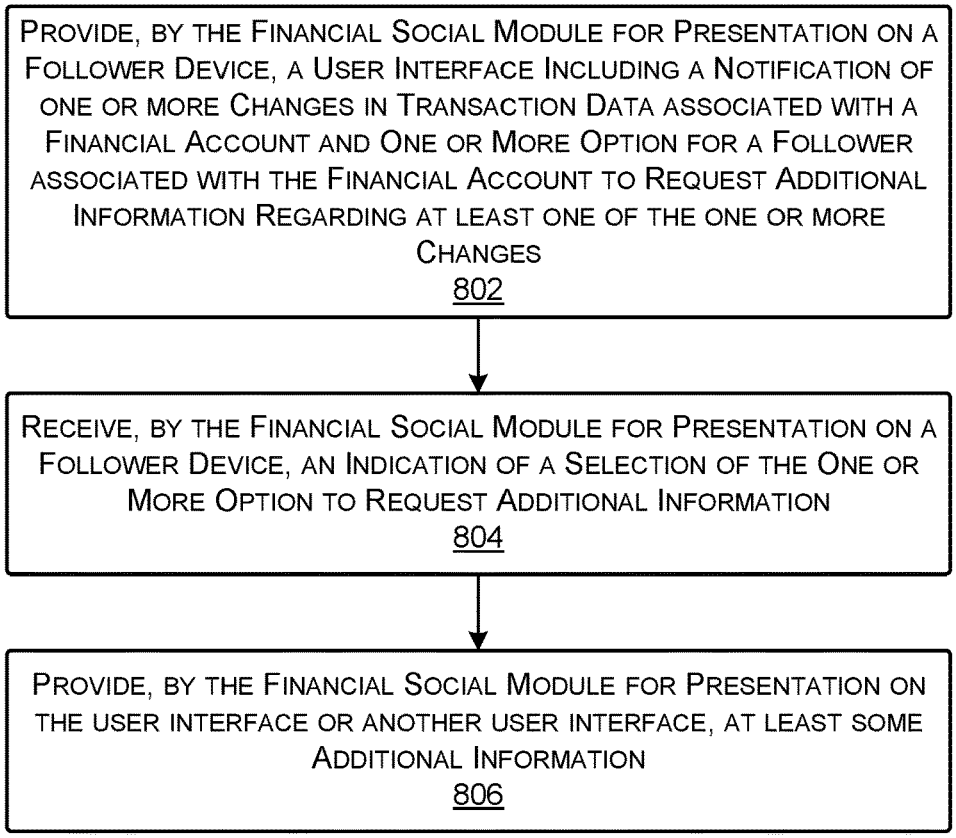
FIG. 8 is a flow diagram illustrating an example process for providing a user interface including information about changes to transaction data, as described herein.

FIG. 8 is a flow diagram illustrating an example process 800 for providing a user interface including information about changes to transaction data, as described herein.

Block 802 illustrates providing, by the financial social module for presentation on a follower device, a user interface including a notification of one or more changes in transaction data associated with a financial account and one or more options for a follower associated with the financial account to request additional information regarding at least one of the one or more changes. The financial social module can provide the user interface on a follower device. In examples, changes can be detected in a process illustrated in FIG. 7 and associated description. The transaction management module can transmit information about the changes in transaction data to the financial social module. Based at least in part on the information, the financial social module can provide a user interface including a notification of the one or more changes.

Block 804 illustrates receiving, by the financial social module, an indication of a selection of at least one of the one or more options to request additional information.

Block 806 illustrates providing, by the financial social module for presentation on the user interface or another user interface, at least some of the additional information requested. In examples, the additional information can include one or more of an identity of who made the change, an amount of the change (e.g., in dollars, percentage, etc., a date of the change, a history of changes to a transaction or transaction data, etc.), a reason for the change, etc. In examples, the additional information that the financial social module provides can be based at least in part on information that the financial social module receives from the transaction management module. The information that the transaction management module provides can be based, at least in part, on the identity of the follower. As discussed above, the transaction management module can assign different permission levels to different followers based at least in part on the followers' characteristics. In examples, the transaction management module can apply rules (or implement user requests) to classify followers by their relationship to the entity or user associated with the financial account. Each class can be associated with a permission level with respect to the transaction data. In an example, the lowest permission level can be configured to only be able to view a dollar amount of a change detected in a transaction, while a highest permission level can be configured to be able to receive additional information including one or more of the dollar amount of the change, reason for the change, the identity of person changing the data, etc.

Using Crowd Intelligence About Transactions

In examples, the transaction management module allows users to share or publish transaction data on one or more financial social networks that allow for social collaboration regarding transactions. In examples, followers can follow a financial account, a transaction management platform account, a thematic repository, and/or one or more transactions; share information from or about the published transaction data with others; post a comment regarding the published transaction data; and/or indicate approval (or "like") published transaction data, etc.

In examples, the transaction management module publishes reactions from followers so that users, entities, and other followers of the platform can see them. In other examples, when transaction data is published to the entire public, reactions from the public can be available to all other members of the public.

Input collected via social collaboration can create crowd intelligence for the user or entity. The crowd intelligence can help entities identify transactions (or areas or accounts or categories of transactions) that may require attention or more careful financial management. In an example, if a threshold number of followers indicates disapproval of a certain transaction or category of transactions, the transaction management module can notify the entity.

By enabling different classes of followers and stakeholders to react to transaction data via social collaboration, crowd intelligence can detect aberrations in the transaction data (e.g., high expenses, odd buying patterns, etc.) that can be missed by a financial controller or auditor acting independently.

Reactions to transaction data can be fed into a machine learning algorithm to identify and flag aberrations and/or trends in spending. In at least one example, a data model(s) can be trained utilizing machine learning mechanisms in which input data relates to historical transaction patterns and characteristics. The input data can include descriptive data indicative of characteristics and trends of the historical transactions. The data model(s) can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. For a particular transaction (or set of transactions), a trained data model can output a similarity score indicative of whether the particular transaction (or set of transactions) is aberrant. Automatic identification of aberrations and/or trends of transactions increases the value to followers of the transaction data.

As part of the training of a data model(s), the transaction management module can weight reactions from followers based at least in part on the follower's reputation, credit-ability, and/or expertise. Weight can be based at least in part on a reputation score and/or credibility score assigned by the transaction management module to followers who are reacting (e.g., commenting, expressing disapproval, etc.). The reputation score and/or credibility score can be based at least in part on a user profile, history of reactions to other published transaction data, publicly available information about the follower, or third-party validation of the person's credentials (e.g., accreditation by an organization). For example, the transaction management module may assign a higher weight to a follower who has an accounting background than to a reviewer who does not.

Additionally or alternatively, the transaction management module can use a machine learning algorithm to generate an importance score to discussions about published transaction data, based at least in part on factors including one or more of the quantity of comments, reputation score of the commenters, recency of comments, length of comments, etc. The transaction management module can determine to post a discussion on a user dashboard or other user interface or forum if the importance score is above a threshold score and/or if the content of the discussion is determined to be of interest to the user.

User Interfaces

Figure 9:
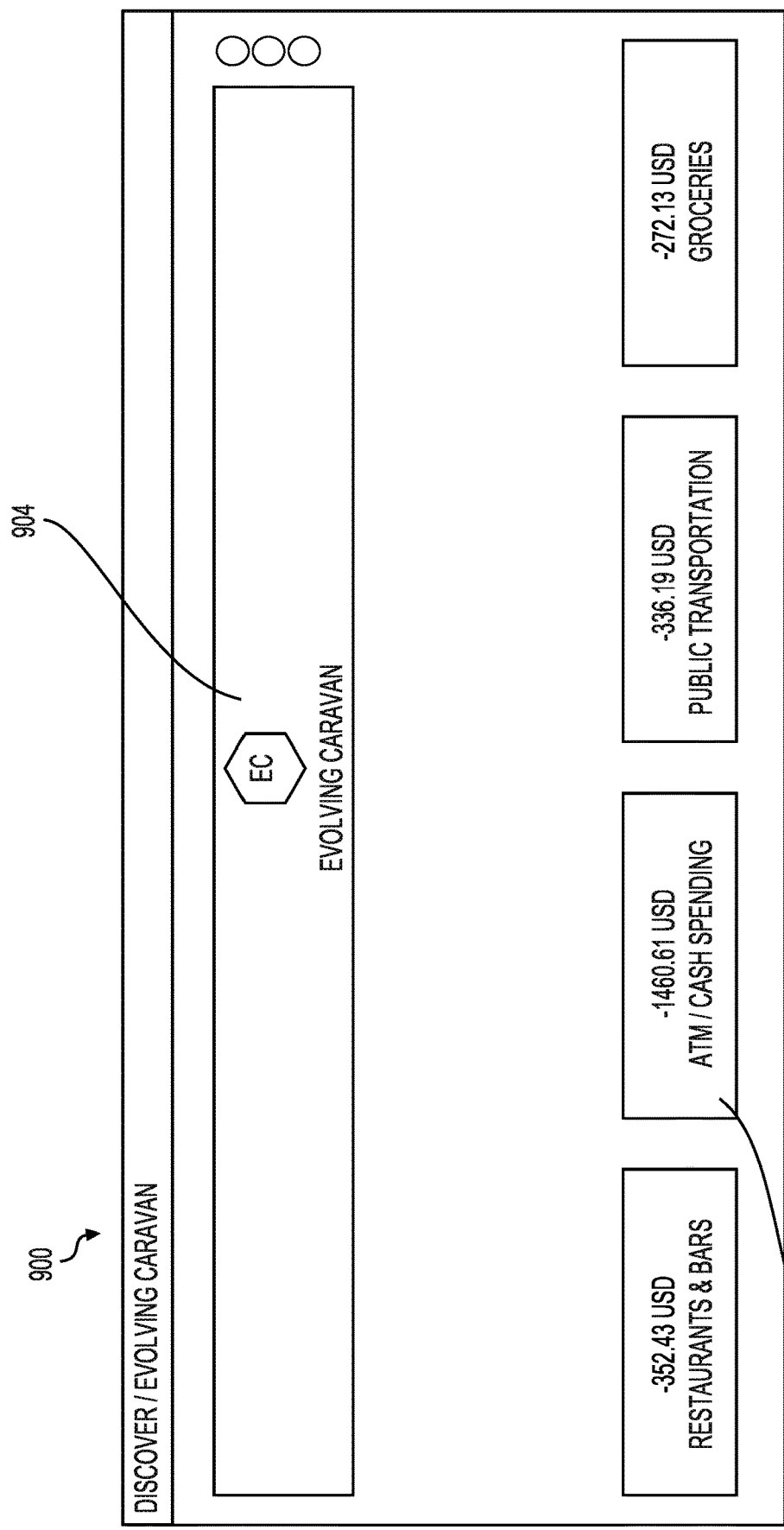
FIG. 9 illustrates an example user interface (UI) that provides information regarding categories of transactions of an entity, as described herein.
Figure 10:
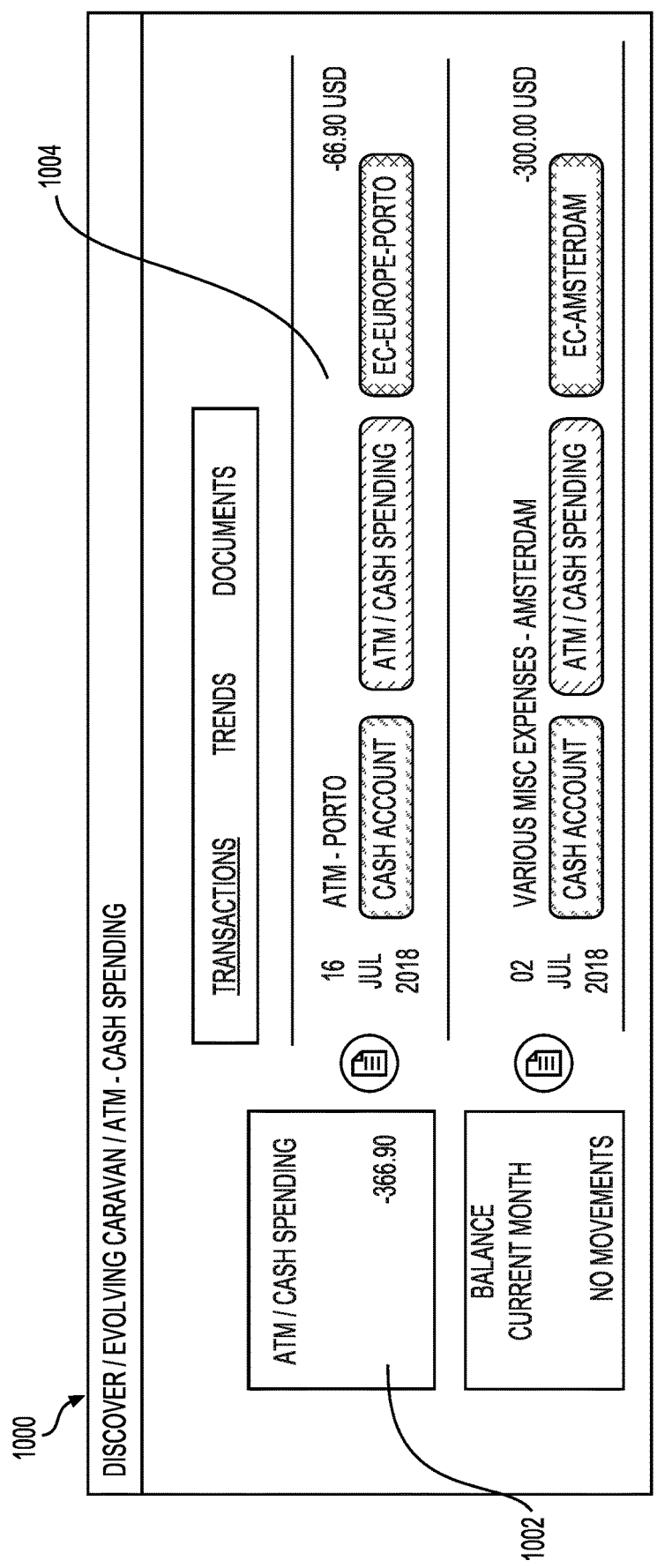
FIG. 10 illustrates an example UI that provides a list of transactions and associated information for one category of the categories of transactions illustrated in FIG. 9, as described herein.
Figure 11:
FIG. 11 illustrates an example UI that provides details regarding a transaction of the list of transactions of FIG. 10.

FIGS. 9-11 illustrate example UIs of a financial social network that provide information regarding transactions of financial account(s) of an entity.

FIG. 9 illustrates an example user interface (UI) 900 that provides information regarding categories of transactions of an entity, as described herein. FIG. 9 is a UI presented by the financial social network that provides graphical icons for individual categories of transactions. For example, graphical icon 902 represents the "ATM/Cash Spending" category of transactions and indicates 1,460.41 USD of transaction activity in a period of time (not shown). Other graphical icons presented on the example UI 900 include those for the categories of "Public Transportation," "Restaurants & Bars," "Groceries," etc. The transactions are retrieved from a financial account of an entity 904 ("Evolving Caravan"). The UI 900 presents graphical icons (top right corner of UI) that, when selected, allow sharing of the page to external social media sites (e.g., Facebook™, Twitter™, LinkedIn™, etc.) to enable sharing information from UI 900 or other information associated with the entity to the UI/webpage.

FIG. 10 illustrates an example UI that provides a list of transactions and associated information for one category of the categories of transactions illustrated in FIG. 9, as described herein.

Graphical icon 1002 lists the name of the category, "ATM/Cash Spending," corresponding to graphical icon 902 in FIG. 9. The transactions of that category are presented in a list on UI 1000. The transaction 1004 presented at the top of the list is "ATM—Porto" and includes the amount (66.90 USD) and date (Jul. 16, 2018). UI 1000 additionally presents the accounts, tags and/or categories associated with transaction 1004 ("Cash Account", "ATM/Cash Spending," "EC Europe—Porto") which can be displayed in different colors from each other. Above the list of transactions are tabs for "Transactions" (the active tab), "Trends," and "Documents." Trends, if selected, can present the aggregate and trend intelligence regarding the transactions associated with the "ATM/Cash Spending" category. The graphical icon presented on the left side of transaction 1004 is selectable to present transaction detail about transaction 1004, as illustrated in FIG. 11. The graphical icon can be displayed in a color (e.g., red). As described above, the transaction management module(s) can generate and present information related to how many (and which) transactions occurred within a time period (e.g., one month, one year, etc.), how many transactions are in the category (e.g., 100 transactions over $1,000, 2 international transactions, etc.), etc. The "Documents" tab, if selected, can present electronic documents associated with the account automatically or manually (e.g., by an entity, user, follower, etc.) UI 1000 additionally includes a graphical icon representing "Balance" that can provide movements in the balance over a period (e.g., current month).

FIG. 11 illustrates an example UI 1100 that provides details regarding a transaction (transaction 1004) of the list of transactions illustrated in FIG. 10. FIG. 11 provides transaction detail for the "ATM—Porto" transaction 1004 for –616.90 USD on Jul. 16, 2018. UI 1100 indicates that the account for the transaction is "Cash Account", the description is "ATM—Porto," the category is "ATM/Cash Spending," and the date is Jul. 16, 2018. UI 1100 also includes an indication stating, "Manual Transactions." This can indicate that the transaction was entered manually by a user. Other transactions could indicate "Automatic Transaction," "Direct Upload Transaction," or the like, to show that the transaction was obtained from the financial institution rather than from manual user entry. The right block of UI 1100 lists "Tags" (e.g., "EC Europe—Porto") and "Attachments" (none is presented in UI 1100). An icon can be presented adjacent to the name of the financial account to represent that account (e.g., a different icon can be presented for credit card transactions, transfers, etc.)

Syncing API

Figure 12A:
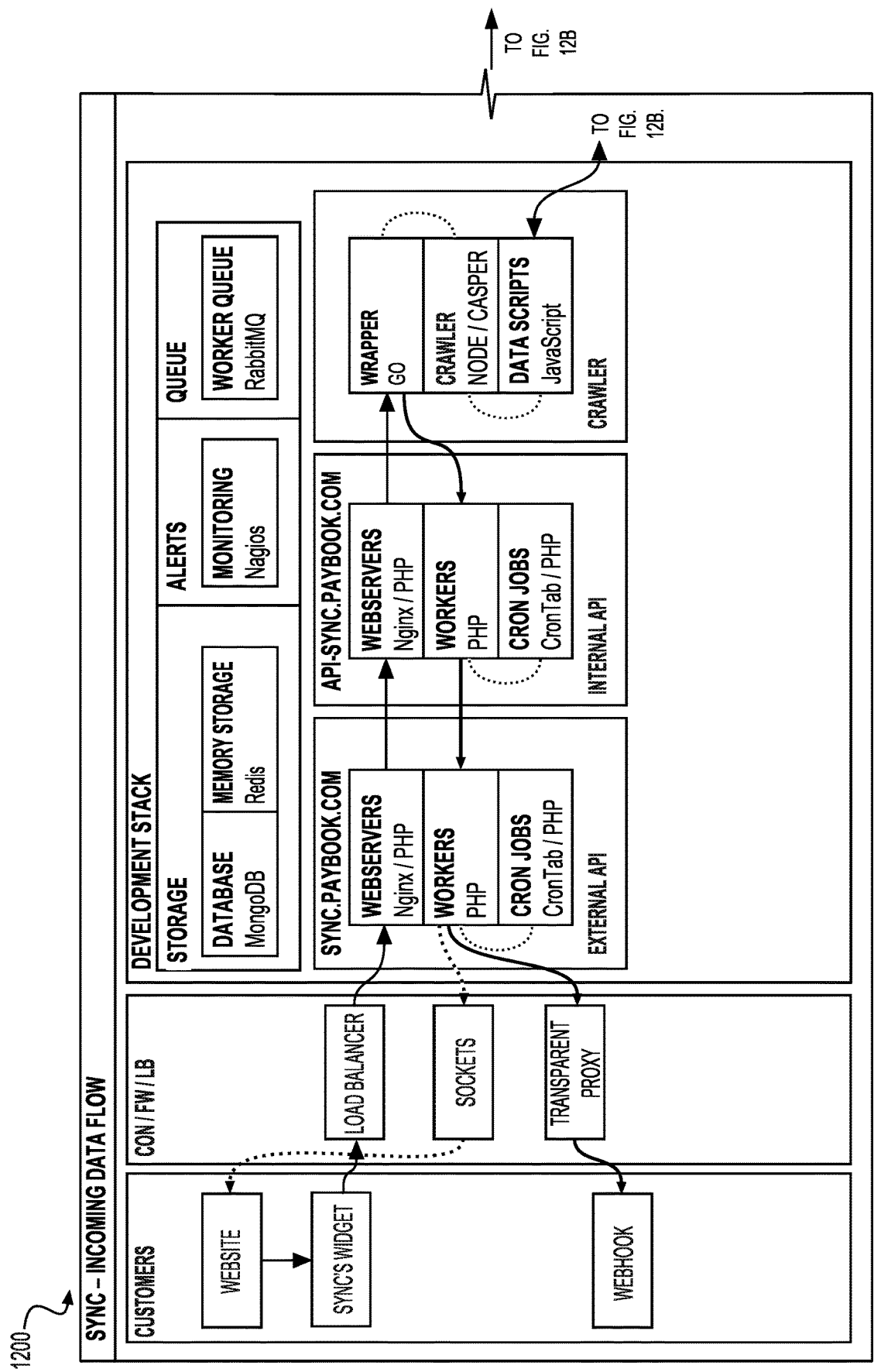

FIGS. 12A and 12B illustrate a flow diagram illustrating an example process 1200 for incoming data flow associated with a syncing service.

In the illustrated example, a customer can submit a request to a website associated with the transaction management platform.

The request can be transmitted to a widget of the syncing service, from the syncing service to a load balancer, then to an external API of the syncing service. The external API can process customers' requests, filters customers' data, enforces billing policies, tracks usage, sends webhooks, etc.

The external API sends request to an internal API of the syncing service. A firewall can be in place between the external API and the internal API. The firewall establishes compliance with regulatory requirements for protecting financial transaction data by isolating the front end of the transaction management module from the back end. External communications are routed to the external API, and the external API communicates with the internal API.

The internal API can store account credentials, run credentials daily, execute jobs, and communicate with a crawler to fetch information from financial institutions (e.g., banks, blockchain, etc.) via a transparent proxy. The internal API can queue the request and works against the queue to perform actions requested by users. The crawler is in charge of fetching information from sites. The crawler includes a sync process that listens into a worker queue.

The crawler connects to financial institutions via APIs or web scraping. The crawler can use business logic specific to a financial institution to collect the financial transaction data. The crawler can pull down a queue from the caller and different workers can process the queue depending on the job site (e.g., internal to transaction management module; processing of external financial data). The crawler can be core logic that contains instructions needed to consume data from external sources (e.g., financial institutions) combined with external-source specific script.

The crawler transmits the transaction data to the internal API.

The internal API can process raw transaction data, including elimination of duplicate data. The internal API can then send the processed transaction data to the external API.

The external API can filter the transaction data and send, via sockets back to the customer via presentation via the website to the customer. The external API can also transmit webhooks via a transparent proxy.

The external API can add all requests to a queue (an external API queue). The external API can process work in the external API queue and transmit commands to the internal API. The external API can send a notification to a user if there is a failure in a request.

In examples, the internal API can instruct the crawler to retrieve the most recent transaction data for an account. The crawler can connect to the financial account using an authorization token, retrieve the transaction data, and send the transaction data to the internal API. The internal API can persist the transaction data.

An internal widget (e.g., "Sync's Widget") can communicate with a load balance to scale APIs.

CONCLUSION

The present subject matter proposes the integration of at least the aforementioned features into a seamless and convenient mechanism for publishing transaction data. With relation to the problems identified previously with conventional systems and methods, the software applications themselves become an active and cooperative component of the process, rather than the subject of it. Further, the aforementioned description is directed to devices and applications that are related to transaction data management. However, it will be understood, that the technology can be extended to any device and application. Moreover, techniques described herein can be configured to operate irrespective of the kind of user devices, server devices, computer networks, and environments. Techniques described herein can be configured to operate in both real-time/online and offline modes.

While the aforementioned disclosure makes reference to user interactions via a UI presented via a display of a device, the UI can be presented via any input/output device. As an example, the UI can be output via a speaker, and augmented reality projector, etc. Further, while the aforementioned disclosure makes reference to a user or follower interacting with the UI via a selectable control, in additional or alternative examples, the user or follower can indicate a selection via a spoken input or other type of input.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices, and methods, as shown and described herein. In any event, the structures, and devices, as well as the associated methods, described herein have many applications. Therefore, the disclosed subject matter should not be limited to any single example described herein, but rather should be construed in breadth and scope in accordance with the appended claims.

Various instructions, methods, and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media. Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

Example Clauses

Clause 1. A method, implemented by one or more servers of a transaction management platform, comprising:
  requesting, from a financial institution, transaction data corresponding to one or more financial transactions associated with a financial account of an entity;
  receiving, from the financial institution, the transaction data;
  storing the transaction data and an association of the transaction data with a user account of an authorized user of the transaction management platform; and
  based at least in part on receiving an instruction from the authorized user, publishing the transaction data to create published transaction data, wherein publishing comprises allowing access to at least a portion of the transaction data.

Clause 2. The method of clause 1, further comprising receiving the transaction data from at least one of a bank account, a cash account, an investment account, or a digital wallet.

Clause 3. The method of any one or more of clauses 1 or 2, further comprising:
receiving user credentials for the user account from the authorized user;
receiving a jurisdiction of the financial account from the authorized user; and
selecting, based at least in part on the jurisdiction, one of the transaction management platform or a third party as interface to the financial institution, of at least financial account credentials of the authorized user and a request for the transaction data.

Clause 4. The method of any one or more of clauses 1-3, further comprising providing a notification regarding the published transaction data to at least one follower of the published transaction data, wherein the notification comprises at least one of an email, a text message, or a graphical icon on a display of the published transaction data.

Clause 5. The method of any one or more of clauses 1-4 further comprising enabling, at least in part by application of permission rules, a first follower of the published transaction data to view a first portion of the published transaction data and a second follower of the published transaction data to view a second portion of the published transaction data.

Clause 6. The method of clause 5, wherein the permission rules are based at least in part on preferences of the authorized user, characteristics of the first follower, and characteristics of the second follower.

Clause 7. The method of clause 6, wherein the characteristics are based at least in part on one or more of profile information from a profile of the first or second follower on the transaction management platform or a financial social network, publicly available information, other information provided by the first or second follower to the transaction management platform or the financial social network, information provided by the authorized user, or information provided by the entity.

Clause 8. The method of any one or more of clauses 1-7, further comprising:
based at least in part on receiving the transaction data, applying a hashing algorithm to the transaction data, creating hashed transaction data;
storing the hashed transaction data;
monitoring the hashed transaction data to determine if hashed transaction data has changed; and
based at least in part on determining that at least part of the hashed transaction data has changed, presenting an indication associated with the published transaction data or notifying followers.

Clause 9. The method of any one or more of clauses 5, 6, or 7, wherein the permission rules determine permissions comprising at least one of viewing the transaction data, commenting on the transaction data, sharing the transaction data, or editing metadata of the transaction data.

Clause 10. The method of any one or more of clauses 1-9 further comprising assigning a transaction corresponding to the transaction data to one or more categories based at least in part on one or more of a comparison of the transaction data to one or more predefined categorization rules or receiving a selection of the one or more categories from a device associated with the authorized user.

Clause 11. The method of clause 10 further comprising:
aggregating at least one of the one or more transactions based at least in part on the one or more categories; and
causing presentation of the one or more transactions based at least in part on the one or more categories.

Clause 12. The method of any one or more of clauses 1-11, further comprising:
determining, based at least in part on data indicating interaction of the follower with the published transaction data, a sentiment of the follower corresponding to one or more transactions; and
transmitting, to the authorized user, an indication of the sentiment.

Clause 13. The method of clause 12, wherein the interaction of the follower comprises at least one of a quantity of comments by the follower, a content of comments by the follower, an indication of approval or disapproval, sharing of the published transaction data by the follower, or subscribing to updates of the published transaction data.

Clause 14. The method of any one or more of clauses 12 or 13, further comprising determining a level of financial transparency of the entity based at least in part on a percentage of transactions in a financial account that are published or a percentage of financial accounts of the entity for which transaction data is published by the transaction management platform.

Clause 15. One or more computer-readable media having computer-readable instructions therein that, when executed by one or more processors, cause the one or more processors to perform a method as any one or more of clauses 1-14 recite.

Clause 16. A system comprising:
one or more processors; and
one or more computer-readable media including computer-readable instructions that, when executed by the one or more processors, configure the system to perform a method as any one or more of clauses 1-14 recite.

Clause 17. A system implemented by one or more servers of a transaction management platform comprising, wherein the system comprises:
one or more processors;
one or more computer-readable media storing instructions that, when executed by the one or more processors, cause the system to perform operations comprising:
causing presentation of a first user interface (UI), wherein the first UI receives, from a user of a transaction management platform, user credentials and a jurisdiction of a financial account of an entity;
selecting, based at least in part on authentication of the user credentials and on the jurisdiction, one of the transaction management platform or a third party as interface to a financial institution associated with the financial account;
causing presentation, by the interface, of a second UI that receives a selection from the user of the financial institution and financial account credentials of the user;
transmitting, by the interface to the financial institution, the financial account credentials and an authorization token for the financial institution;
receiving, by the interface and from the financial institution, the authorization token;
storing, by the interface, the authorization token;

transmitting, by the interface and to the financial institution, the authorization token and a request for transaction data associated with the financial account;

receiving, by the interface and from the financial institution, the transaction data;

transmitting, by the interface to a syncing application programming interface (API) associated with the one or more servers, the transaction data;

normalizing, by the syncing API, the transaction data;

generating, by the syncing API, an authenticating token;

storing, by the one or more servers, the transaction data and the authenticating token; and publishing the transaction data to create published transaction data, wherein publishing the transaction data comprises allowing access to at least a portion of the transaction data.

Clause 18. The system of clause 17 further comprising providing a notification regarding the published transaction data to at least one follower of the published transaction data, wherein the notification comprises at least one of an email, a text message, or a graphical icon on a display of the published transaction data.

Clause 19. The system of clause 17 further comprising enabling, at least in part by application of permission rules, a first follower of the published transaction data to view a first portion of the published transaction data and a second follower of the published transaction data to view a second portion of the published transaction data, wherein the first portion and the second portion at least partially overlap.

Clause 20. The system of clause 17 further comprising determining a level of financial transparency of the entity based at least in part on a percentage of transactions in the financial account that are published or a percentage of the accounts of the entity for which transaction data is published by the transaction management platform.

What is claimed is:

1. A method comprising:
    receiving, by one or more servers of a transaction management platform and from a user device of an authorized user of the transaction management platform, an indication of a financial account of an entity at a financial institution;
    determining, by the one or more servers of the transaction management platform and based at least in part on data associated with the financial account and without further user input, a jurisdiction of the financial account;
    determining, by the one or more servers of the transaction management platform and based at least in part on an application of rules and the jurisdiction, whether to use (1) the transaction management platform as an interface to the financial institution or (2) a third party device as the interface to the financial institution;
    transmitting, by the interface to the financial institution, financial account credentials for the financial account and an authorization token for the financial institution;
    receiving, by the interface and from the financial institution, the authorization token, wherein receiving the authorization token comprises receiving the authorization token via communication with the third party device or performing a handshake internally with a syncing application programming interface (API) associated with the one or more servers;
    storing, by the interface, the authorization token;
    transmitting, by the interface and to the financial institution, the authorization token and a request for transaction data associated with the financial account, wherein the transaction data is associated with one or more financial transactions;
    responsive to a determination by an API associated with the financial institution that the authorization token is valid, receiving, by the interface and from the financial institution, the transaction data;
    transmitting, by the interface to the syncing API, the transaction data;
    generating, by the syncing API, an authenticating token;
    storing, by the one or more servers, the transaction data and the authenticating token; and
    based at least in part on receiving an instruction from the authorized user, publishing, by the one or more servers of the transaction management platform, the transaction data to create published transaction data, wherein publishing comprises allowing access to at least a portion of the transaction data.

2. The method of claim 1, wherein the financial account comprises at least one of a bank account, a cash account, an investment account, or a digital wallet.

3. The method of claim 1, further comprising notifying, by the one or more servers of the transaction management platform, at least one follower of the published transaction data regarding receipt of the published transaction data, change to the published transaction data, or deletion of the published transaction data, wherein notifying comprises at least one of notifying via an email, a text message, or a graphical icon on a display.

4. The method of claim 1 further comprising enabling, by the one or more servers of the transaction management platform, at least in part by application of permission rules, a first follower of the published transaction data to view a first subset of the published transaction data and a second follower of the published transaction data to view a second subset of the published transaction data.

5. The method of claim 4, wherein the permission rules are based at least in part on first characteristics of the first follower and second characteristics of the second follower,
    wherein the first characteristics are based at least in part on first profile information from a first profile of the first follower on the transaction management platform or a financial social network integrated within the transaction management platform via a third-party application, and
    wherein the second characteristics are based at least in part on second profile information from a second profile of the second follower on the transaction management platform or the financial social network integrated within the transaction management platform via the third-party application.

6. The method of claim 4, wherein the permission rules determine permissions comprising editing metadata of the transaction data.

7. The method of claim 1, further comprising:
    based at least in part on receiving the transaction data, applying, by the one or more servers of the transaction management platform, a hashing algorithm to the transaction data, creating hashed transaction data;
    storing, by the one or more servers of the transaction management platform, the hashed transaction data;
    monitoring, by the one or more servers of the transaction management platform, the hashed transaction data to determine if at least a part of the hashed transaction data has changed; and
    based at least in part on determining that at least part of the hashed transaction data has changed, presenting, by the one or more servers of the transaction management platform, an indication associated with the published transaction data or notifying followers.

8. The method of claim 1 further comprising assigning, by the one or more servers of the transaction management platform, a transaction corresponding to the transaction data to one or more categories based at least in part on one or more of a comparison of the transaction data to one or more predefined categorization rules or receiving a selection of the one or more categories from a device associated with the authorized user.

9. The method of claim 8 further comprising:
aggregating, by the one or more servers of the transaction management platform, a plurality of the one or more financial transactions based at least in part on the one or more categories; and
causing presentation of, by the one or more servers of the transaction management platform, the one or more financial transactions based at least in part on the one or more categories.

10. The method of claim 1, further comprising:
determining, by the one or more servers of the transaction management platform, based at least in part on data indicating an interaction of a follower with the published transaction data, a sentiment of the follower corresponding to one or more transactions; and
transmitting, by the one or more servers of the transaction management platform to the authorized user, an indication of the sentiment.

11. The method of claim 10, wherein the interaction of the follower comprises at least one of a quantity of comments by the follower or subscribing to updates of the published transaction data.

12. The method of claim 10, further comprising:
determining, by the one or more servers of the transaction management platform, a first percentage of transactions in the financial account that are published or a second percentage of a plurality of financial accounts of the entity for which the transaction management platform publishes transaction information; and
determining, by the one or more servers of the transaction management platform, a level of financial transparency of the entity based at least in part on the first percentage or the second percentage.

13. The method of claim 1, wherein the transaction data is received via a crawler using business logic specific to the financial institution.

14. The method of claim 1, further comprising:
transmitting, by the one or more servers of the transaction management platform and to one or more quality control computing devices, the transaction data; and
receiving, by the one or more servers and from the one or more quality control computing devices, an indication that formatting of the transaction data complies with one or more templates stored in one or more databases associated with the one or more quality control devices.

15. One or more non-transitory computer-readable media having computer-readable instructions therein that, when executed by one or more processors, cause the one or more processors to perform operations comprising:
receiving, by one or more servers of a transaction management platform and from a user device of an authorized user of the transaction management platform, an indication of a financial account of an entity at a financial institution and financial account credentials of the entity corresponding to the financial account;
determining, by the one or more servers of the transaction management platform and based at least in part on data associated with the financial account and without further user input, a jurisdiction of the financial account;
determining, by the one or more servers of the transaction management platform and based at least in part on an application of rules and the jurisdiction, to use the transaction management platform as an interface to the financial institution;
transmitting, by the interface to the financial institution, the financial account credentials and an authorization token for the financial institution;
receiving, by the interface and from the financial institution, the authorization token, wherein receiving the authorization token comprises receiving the authorization token by performing a handshake internally with a syncing application programming interface (API) associated with the one or more servers;
storing, by the interface, the authorization token;
transmitting, by the interface and to the financial institution, the authorization token and a request for transaction data associated with the financial account, wherein the transaction data is associated with one or more financial transactions;
responsive to a determination by an API associated with the financial institution that the authorization token is valid, receiving, by the interface and from the financial institution, the transaction data;
transmitting, by the interface to the syncing API, the transaction data;
generating, by the syncing API, an authenticating token; and
storing, by the one or more servers, the transaction data and the authenticating token.

16. A system implemented by one or more servers of a transaction management platform, wherein the system comprises:
one or more processors; and
one or more computer-readable media storing instructions that, when executed by the one or more processors, cause the system to perform operations comprising:
causing presentation of a first user interface (UI), wherein the first UI receives, from a user of the transaction management platform, user credentials of the user for the transaction management platform and an indication of a financial account of an entity at a financial institution;
determining, based at least in part on data associated with the financial account and without further user input, a jurisdiction of the financial account;
determining, based at least in part on an application of rules and the jurisdiction, whether to use (1) the transaction management platform as an interface to the financial institution or (2) a third party device as the interface to the financial institution;
causing presentation, by the interface, of a second UI that receives a selection from the user of the financial institution and financial account credentials of the user;
transmitting, by the interface to the financial institution, the financial account credentials and an authorization token for the financial institution;
receiving, by the interface and from the financial institution, the authorization token, wherein receiving the authorization token comprises receiving the authorization token via communication with the third party device or performing a handshake internally with a syncing application programming interface (API) associated with the one or more servers;

storing, by the interface, the authorization token;

transmitting, by the interface and to the financial institution, the authorization token and a request for transaction data associated with the financial account;

responsive to a determination by an API associated with the financial institution that the authorization token is valid, receiving, by the interface and from the financial institution, the transaction data;

transmitting, by the interface to the syncing API, the transaction data;

normalizing, by the syncing API, the transaction data;

generating, by the syncing API, an authenticating token;

storing, by the one or more servers, the transaction data and the authenticating token; and publishing the transaction data to create published transaction data, wherein publishing the transaction data comprises allowing access to at least a portion of the transaction data.

17. The system of claim 16, the operations further comprising:

determining a first percentage of transactions in the financial account that are published or a second percentage of a plurality of accounts of the entity for which the transaction management platform publishes transaction information; and determining a level of financial transparency of the entity based at least in part on the first percentage or the second percentage.

18. The system of claim 16, the operations further comprising:

training a machine learning model using training data comprising descriptive data associated with a plurality of historical transactions;

determining, based at least in part on applying the machine learning model to one or more transactions of a plurality of transactions associated with the transaction data, that the one or more transactions is aberrant from a trend of the plurality of historical transactions; and based at least on determining that the one or more transactions is aberrant, presenting an indication associated with the published transaction data or notifying followers.

19. The system of claim 16, the operations further comprising:

training a machine learning model using training data comprising descriptive data associated with a plurality of historical transactions and a plurality of reactions of followers to the plurality of historical transactions, wherein a particular reaction of a follower of the followers is weighted according to at least one of a reputation score or a credibility score assigned by the one or more servers of the transaction management platform to the follower based at least in part on one or more of a user profile, a history of reactions by the follower to other published transaction data, publicly available information about the follower, or third-party validation of credentials of the follower; and determining, based at least in part on the machine learning model, additional transaction data, and a reaction of a particular follower to the additional transaction data, to flag an individual published transaction as aberrant.

20. The system of claim 16, the operations further comprising:

training a machine learning model using training data comprising descriptive data associated with a plurality of historical transactions and a plurality of reactions of followers to the plurality of historical transactions, wherein the machine learning model outputs an importance score to discussions associated with transactions, based at least in part on one or more of a quantity of comments, reputation score of commenters, recency of comments, or length of comments.

* * * * *